United States Patent
Nitta

[11] Patent Number: 5,913,211
[45] Date of Patent: *Jun. 15, 1999

[54] DATABASE SEARCHING METHOD AND SYSTEM USING RETRIEVAL DATA SET DISPLAY SCREEN

[75] Inventor: Kiyoshi Nitta, Kanagawa, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,077

[22] Filed: Jun. 26, 1996

[30] Foreign Application Priority Data

Sep. 14, 1995 [JP] Japan ................................ 7-237485

[51] Int. Cl.$^6$ ............................................... G06F 17/30
[52] U.S. Cl. ................................................ 707/5; 707/4
[58] Field of Search ............................................. 707/5, 4

[56] References Cited

U.S. PATENT DOCUMENTS

| | | | |
|---|---|---|---|
| 4,267,568 | 5/1981 | Dechant et al. | 707/5 |
| 4,290,115 | 9/1981 | Pitt et al. | 707/5 |
| 4,653,021 | 3/1987 | Takagi | 707/5 |
| 4,674,066 | 6/1987 | Kucera | 707/5 |
| 4,823,306 | 4/1989 | Barbic et al. | 707/5 |
| 4,833,610 | 5/1989 | Zamora et al. | 707/5 |
| 5,321,833 | 6/1994 | Chang et al. | 707/5 |
| 5,418,951 | 5/1995 | Damashek | 707/5 |
| 5,465,353 | 11/1995 | Hull et al. | 707/5 |
| 5,488,725 | 1/1996 | Turtle et al. | 707/5 |
| 5,544,352 | 8/1996 | Egger | 707/5 |
| 5,546,578 | 8/1996 | Takada | 707/5 |

OTHER PUBLICATIONS

J.B. Kruskal; Multidimensional Scaling by Optimizing Goodness of Fit to a Nonmetric Hypothesis; Psychometrika, vol. 29, No. 1.

J.B. Kruskal; Nonmetric Multidimensional Scaling; a Numerical Method; Psychometrika, vol. 29, No. 2.

Isamu Watanabe; System for Supporting Diffusion Thinking, "Keyword Associator"; Second Edition.

*Primary Examiner*—Paul R. Lintz
*Assistant Examiner*—Frantz Coby
*Attorney, Agent, or Firm*—Armstrong, Westerman, Hattori, Mcleland, & Naughton

[57] ABSTRACT

A method of retrieving a plurality of records stored in a database first generates a retrieval data set by selecting a plurality of records from the database. Then, an item element of a data item designated from a record in the retrieval data set is specified, and the difference in item elements between optional two records is numerically represented and computed as a dissimilarity. Next, the records in the retrieval data set are plotted and displayed on the display device. At this time, the records are displayed in such a way that the distance between the two records of the plotted records corresponds to the computed dissimilarity, and a new retrieval data set is specified from the displayed records on the basis of an object record designated by the user. Thus, a new retrieval data set can be easily generated within a short time, with mis-retrieval and unnecessarily entered records reduced by plotting the records such that the difference between the records can be readily recognized.

25 Claims, 28 Drawing Sheets

DATABASE SEARCHING METHOD AND SYSTEM USING RETRIEVAL DATA SET DISPLAY SCREEN

BACKGROUND OF THE INVENTION

1. Field of the Invention

The present invention relates to a method of searching a database stored in a computer system, and more specifically to a method of searching a database while displaying a set of records to be retrieved.

2. Description of the Related Art

When a database is searched conventionally in a computer, a record to be retrieved is searched for only by repeating the processes of designating an item to be retrieved and retrieval conditions, selecting a record matching the designated item and conditions from the database, and generating a retrieval data set.

However, the above described searching method often encounters the following problems (1) and (2) in the early stages of retrieval.

(1) The record to be retrieved is not in the retrieval data set (mis-retrieval).

(2) A number of records not related to the retrieval are detected in the retrieval data set (noise).

To reduce the mis-retrieval (1) above, retrieving operations are performed two or more times using different items and conditions so that an object record is retrieved from the sum of a plurality of retrieval data sets.

However, if data is retrieved in this method, the number of records in the retrieval data set is considerably large, and the noise increases correspondingly. When a retrieval data set having a lot of noise is used, the retrieval time is extended and the time taken in retrieving a record through continuous retrieval is also extended, thereby substantially lowering the retrieval efficiency. Thus, in the conventional method, it is very difficult to simultaneously solve the problems (1) and (2).

When a record is searched for by continuously obtaining retrieval data sets according to the conventional database searching method, the number of records in a retrieval data set is rather small. Therefore, when data is continuously retrieved using different retrieval items and conditions, the retrieval is performed only in a retrieval data set containing a small number of records. It is difficult to find the way that increase the number of records during the retrival session. Therefore, when the data is being retrieved in the conventional method, it is very hard to continue retrieving the data by a new method with a new retrieval item and conditions.

SUMMARY OF THE INVENTION

The present invention has been developed to solve the above described problems, and aims at providing a database searching method capable of simultaneously solving the mis-retrieval problem and the noise problem, generating retrieval data sets, and easily retrieving an object record in a short time. The present invention further aims at providing a method for continuous retrieval of data even when a new retrieval strategy is adopted using a new retrieval item and new retrieval conditions. It is performed by displaying a number of records with the relationship among the records clearly displayed. So it is no need for starting the retrieval from the beginning.

The retrieval method according to the present invention is a method of searching a database storing records containing information about a plurality of items. The method comprises the steps of generating a retrieval data set by selecting a plurality of records from the database; designating one of the plurality of items as a display item; specifying the item element corresponding to the displayed item of the plurality of records in the retrieval data set; computing the difference in item elements between two records of the plurality of records contained in the retrieval data set and outputting the result as a dissimilarity (difference level); and plotting the plurality of records in such a way that the dissimilarity corresponds to the distance between the two records.

The system according to the present invention searches a database storing a plurality of records containing the information about a plurality of items. It comprises a database storage unit for storing a database; a dissimilarity computing unit for computing the difference between the elements corresponding to the display items designated from among the plurality of items and outputting it as a dissimilarity; and a display unit for plotting the plurality of records in a way that the dissimilarity corresponds to the distance between the two records.

The storage medium according to the present invention stores a program for directing a computer (for example, a processor 2 in FIG. 2) to perform the above described steps of the method according to the present invention through a driver connected to the computer. The storage medium can be an optical disc, magnetic disk, optical magnetic disk, or any of various storage media.

According to the present invention, when a record to be retrieved is displayed, the relationship among the records is visually determined. Therefore, it is apparent which record is the most closely related to the object record, even when the retrieval data set contains a large number of records, to avoid mis-retrieval. As a result, the object record can be searched for in a short time without mis-retrieval. Furthermore, since a retrieval data set can be searched with a large number of records contained in it by this method, data can be continuously retrieved using the same retrieval data set even if a new retrieval standard is adopted. Thus, the object record can be retrieved in a considerably short time.

The present invention can also plot a plurality of records on a display device in a one-, two-, or three-dimensional diagram, in such a way that the dissimilarity between two records may correspond to the distance between them. Thus, the dissimilarity between one object record and another record can be easily displayed on the display screen. Since it is very easy to set a scope in which a retrieval data set can be generated on the display, by referring to an object record, the next step in the retrieving process can be entered within a short time.

When a display item is a quantitative item, for example, a date, etc., the dissimilarity is obtained as a square root of a difference between the elements corresponding to the display items of records, or as an absolute value of a difference. Especially, if the display item refers to an item comprising a plurality of categories such as a classification code, etc., then the element corresponding to the display item of a record is weighed in a way that a portion corresponding to a larger category in the element is heavier in weight, and the weighed element is represented numerically. The square root or absolute value of the numerically represented difference is processed as a dissimilarity.

When a display item refers to a set of identifiers or proper nouns, the dissimilarity is represented by a reciprocal ($1/(1+x)$) of a value obtained by adding 1 to the number ($x$) of elements commonly contained in two records.

When a display item refers to a name or an item containing a document, for example, an abstract, the dissimilarity is represented by a reciprocal (1/(1+x)) of a value obtained by adding 1 to the number (x) of words or key words commonly contained in the two records, in all words or key words containing synonyms contained in the two optional records. In this case, the dissimilarity can be represented by a reciprocal (1/(1+x)) of a value obtained by adding 1 to the sum (x).

According to the present invention, a retrieval data set can be determined based on a plurality of display items. In this case, the dissimilarity between the optional two records is obtained for each item by the above described methods. Then, a mean value and a dispersion value of the obtained dissimilarity are computed for each item, and the dissimilarity is normalized using the mean value and dispersion value. The normalized dissimilarity is added to another dissimilarity corresponding to the same two records to be a synthetic dissimilarity between the two records. All records are plotted in a way that the synthetic dissimilarity may correspond to the distance between the two records. The normalized dissimilarity is added to another dissimilarity after being weighed.

Since data can be retrieved simultaneously in consideration of a plurality of items, a retrieval result can be displayed and determined on one screen display (data has been conventionally retrieved on a plurality of screen displays), thereby substantially reducing the retrieval time.

According to the present invention, a contradiction, indicating the inconsistency between the positions of the plotted records and the dissimilarity between the records, can be displayed. Thus, the user can be informed to what extent the dissimilarity between the records is reflected in the displayed positions of the records. If the contradiction is large, the user can re-plot the data to select the positions of the data and reduce the contradiction. As a result, the user can correctly retrieve data in a short time.

The contradiction can be numerically displayed on the record display screen, or displayed on a bar graph. Furthermore, the contradiction can be represented by a color assigned to a plurality of records or a color of the background. At this time, the correspondence list between the colors and the levels of the contradiction can also be displayed. Displaying the contradiction by the above described methods allows the user to be easily and visually informed of the contradiction. Thus, the retrieval effectiveness can be improved.

DESCRIPTION OF THE PREFERRED EMBODIMENT

Figure 1:
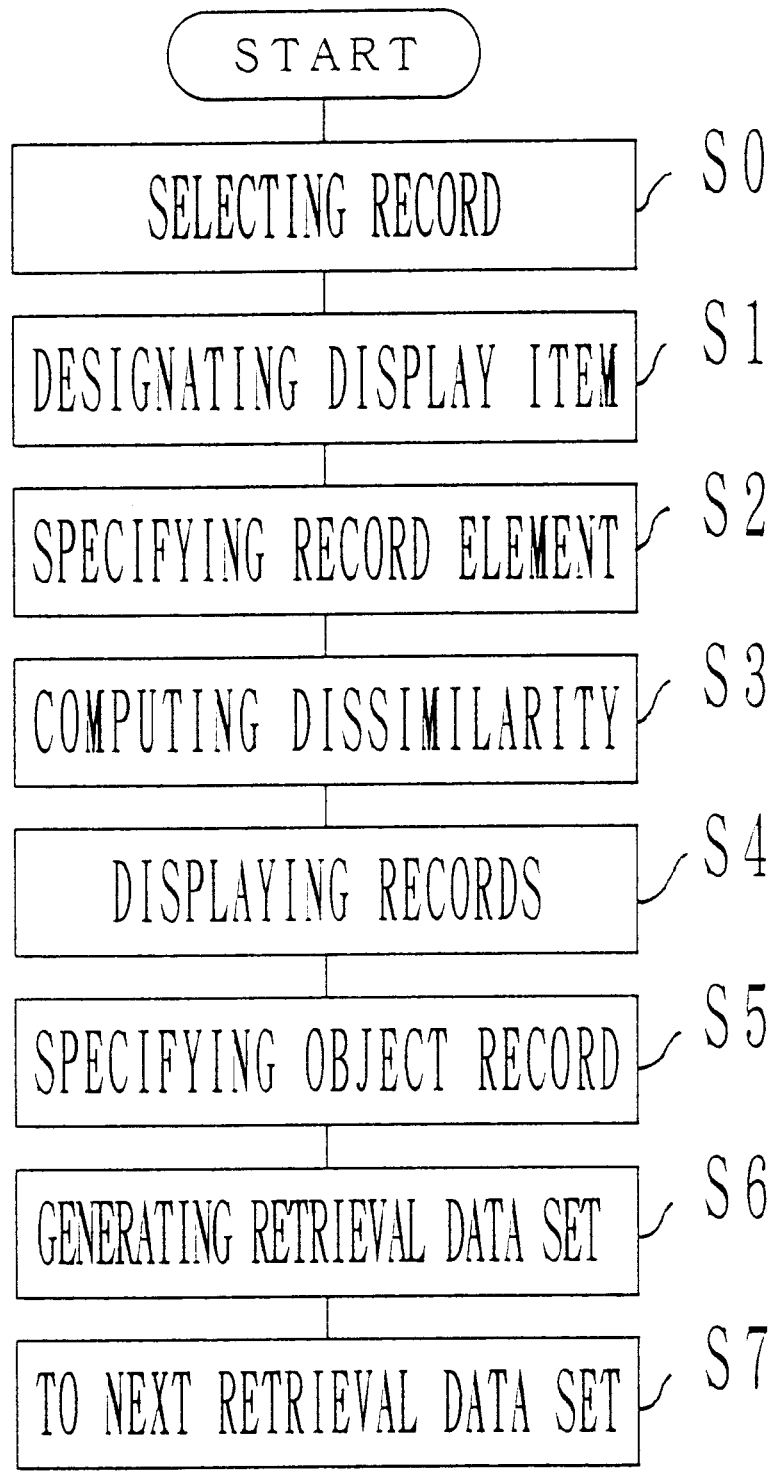
FIG. 1 is a flowchart showing the basic configuration for the database searching method according to the present invention.

FIG. 1 is a flowchart showing the basic configuration of the database searching method according to the present invention.

As shown in FIG. 1, the database searching method according to the present invention generates a retrieval data set by selecting a plurality of records from a database comprising a plurality of records having the information about a plurality of items (step S0), designates a display item as a reference in displaying a record (step S1), and specifies the record element corresponding to the display item designated from among the plurality of the selected records (step S2). The plurality of the records can also be selected by specifying a retrieval data set by a conventional method. Furthermore, a record element can be directly specified for a plurality of records in the database.

Then, the difference between the specified record elements of two records in a plurality of records is represented numerically, and computed as a dissimilarity (step S3). Then, the records are plotted and displayed in a way that the computed dissimilarity corresponds to the distance between the two corresponding records (step S4). Then, one of a plurality of plotted records is specified as an object record (step S5), and a new retrieval data set is generated by selecting a record group from the plurality of plotted records (step S6). Records are continuously retrieved in the new retrieval data set (step S7).

Figure 2:
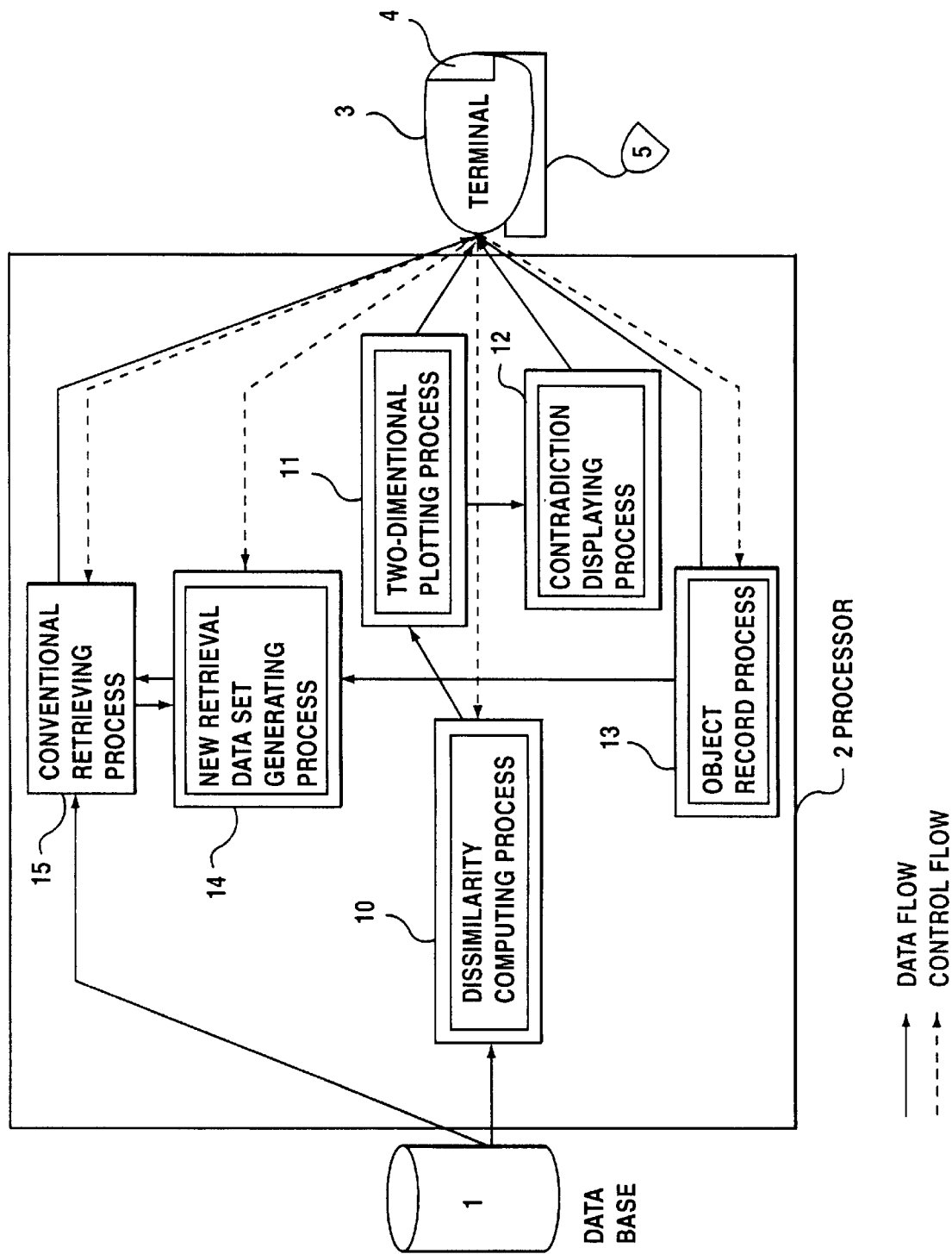
FIG. 2 shows the configuration of the system for realizing the present invention.

FIG. 2 shows the configuration of the system for realizing the database searching method according to the present invention.

The present system comprises a database 1 for storing a plurality of records; a processor 2 of a computer for retrieving a plurality of records stored in the database 1; and a terminal 3 provided with a display device 4 for displaying a retrieval state and retrieval result obtained by the processor 2. The database 1 stores a plurality of records containing the information corresponding to a plurality of items.

Described below in detail is the function of the processor 2. The solid lines in FIG. 2 indicate the flow of the record information, while the broken lines indicate the system control transmitted from the terminal 3.

The processor 2 performs a dissimilarity computing process 10 for the records in the database, and a two-dimensional plotting process 11, in such a way that the dissimilarity corresponds to the distance between the records. The result of the two-dimensional plotting process 11 is displayed on the display device 4 of the terminal 3. The processor 2 computes the contradiction between the dissimilarity and plotted positions of the records and displays the result of the contradiction displaying process 12 on the display device 4. The processor 2 performs an object record process 13 in which one or more records of the records to be retrieved are designated as object records, and also performs a new retrieval data set generating process 14 in which a new retrieval data set is generated using a record group specified according to the object records. The processor 2 performs a conventional retrieving process 15 on the database 1 and transmits the result to the terminal 3. It further generates a retrieval data set in the conventional retrieving process 15, and performs the above described process to search the retrieval data set. It also performs the conventional retrieval process on the new retrieval data set generated as described above.

The above listed processes are performed by the processor 2 using software, hardware, or both. The processor 2 can be provided with a unit for performing each of the above listed processes. The terminal 3 is provided with a selecting device 5 such as a mouse, etc. for use in designating an object record.

Each of the processes performed by the processor 2 shown in FIG. 2 is realized by a computer program and executed through a computer. The program is written on a storage medium such as an optical disk, magnetic disk, optical magnetic disk, or any other storage media, and stored externally or in the computer.

Described below is the retrieval process using the above described system. According to the present embodiment, the database stores the information including the application filing date, publication date, applicant, inventor, international patent classification code (IPC), title, and abstract about a published patent as an example. These items are used as display items.

Figure 3:
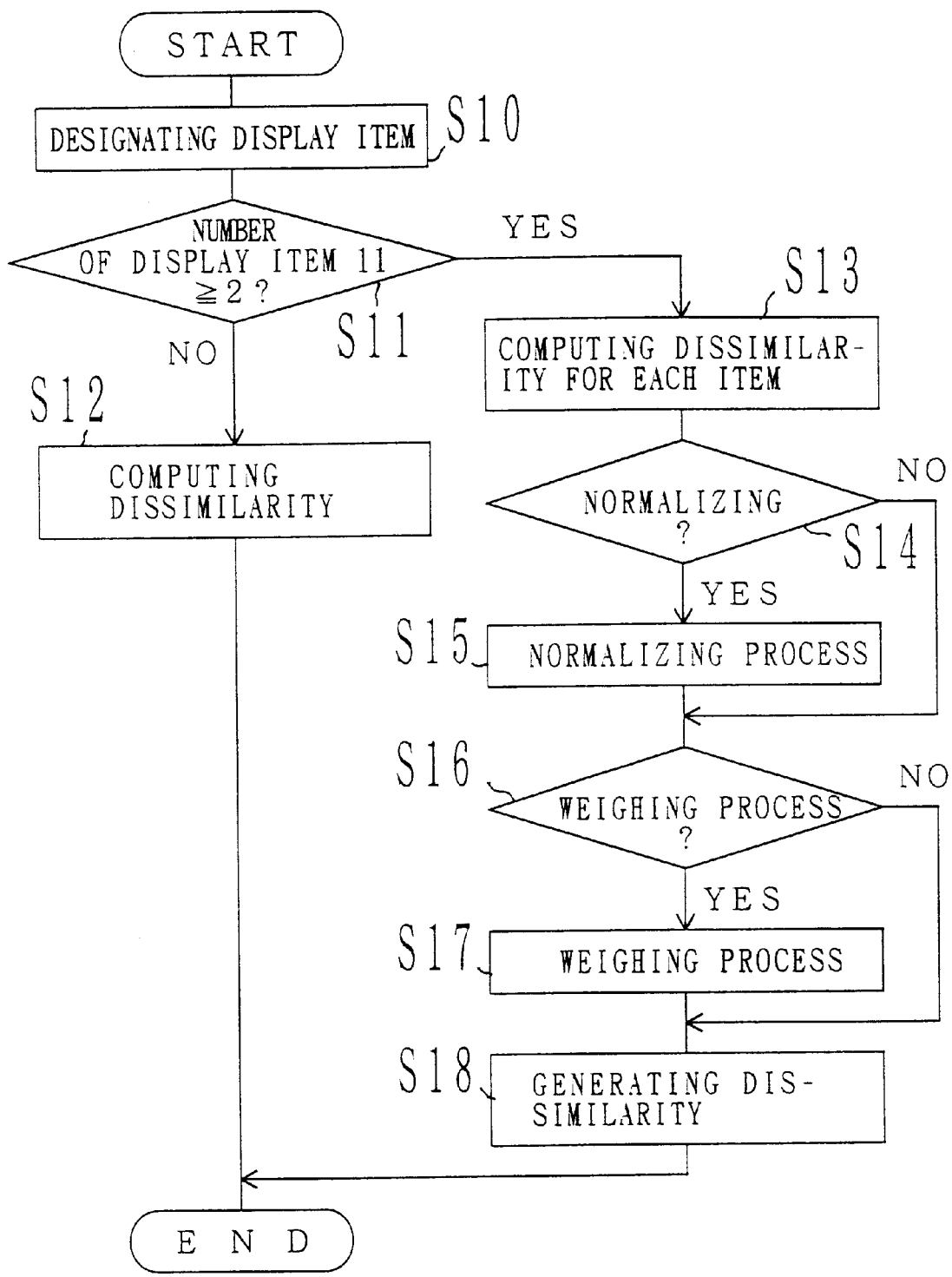
FIG. 3 is a flowchart showing the dissimilarity computing process according to the database searching method of the present invention.

FIG. 3 is a flowchart showing the dissimilarity computing process 10.

In the dissimilarity computing process 10, the user designates a display item (step S10), and then it is determined whether or not the number of the designated display items is two or more (step S11). If the number of display items is one (no in step S11), then the dissimilarity between the records is computed for the display item by the computing method to be described later (step S12).

If the number of display items is two or more (yes in step S11), the dissimilarity between the records is computed for each display item by the computing method to be described later (step S13). If the normalizing process is designated (yes in step S14), the dissimilarity is normalized using the dispersion and average value obtained for each display item (step S15). If the weighing process is designated (yes in step S16), then each display item is weighed corresponding to the dissimilarity (step S17), and a dissimilarity generalizing process is performed in which a synthetic dissimilarity is obtained for each record (step S18).

Described below is the dissimilarity computing method.

In the present embodiment, the database is represented by three data sets (R, A, and V). R is a set of all records in the database. A is a set of the items in the database (7 types of items in the present embodiment). V is a set of functions for use in obtaining the dissimilarity between records. The value or element for item a (a∈A) of a record r (r∈R) is obtained by V (r, a). A dissimilarity computation function set D is prepared for each item and database. All items are provided with d (d∈D), and the dissimilarity for item a of two optional records $r_1$ and $r_2$ ($r_1$, $r_2$∈R) is obtained by a dissimilarity function d ($r_1$, $r_2$). The dissimilarity d is larger, as the difference between records $r_1$ and $r_2$ becomes larger for item a.

A dissimilarity function d is different for each item a. Described below is the method of computing a dissimilarity for each item a.

(1) When a display item is a quantitative item such as a filing date, publication date, etc.;
the element indicating the filing date or publication date of the record r, that is, the record element V (r, a) corresponding to the display item a, is converted into a value, for example, the number of days counted from January 1, 1. Next, the square root or absolute value of the difference between the converted values of two optional records is represented by the following equation (1), and the dissimilarity is represented by the dissimilarity function d.

$$d(r_1, r_2) = \sqrt{\{V(r_1, a) - V(r_2, a)\}^2} \qquad (1)$$

(2) When a display item indicates a set of identifiers or proper nouns, such as applicants and inventors;

The dissimilarity is obtained by the following equation (2) as a reciprocal of a value obtained by adding 1 to the number of identifiers or proper nouns commonly contained in one record element V ($r_1$, a) and the other record element V ($r_2$, a) of two optional records.

$$d(r_1,r_2)=1/[1+\text{size of } \{V(r_1,a) \cap V(r_2,a)\}] \quad (2)$$

where "size of" (x∩y) indicates the number of elements commonly contained in x and y.

(3) When a display item indicates an item comprising a plurality of categories, such as international patent classification code (IPC);

The element V corresponding to the item a is numerically represented after being weighed. A portion corresponding to a larger category in the element is weighed as being heavier. The square root or absolute value of the difference between the numerically represented values is referred to as a dissimilarity.

Assume that the element V corresponding to the item a is categorized into n columns, that the number of values (types) assignable to each column is Ki (where i=1, 2, ..., n), and that the element V is represented by C1 C2 ... Cn. C1 indicates the largest category, and categories become smaller from C1 to Cn. At this time, the value k(r) of the weighed element V is obtained by the following equations (3) and (4).

$$k(r)=k_1(r)+k_2(r)+ \ldots +K_n(r) \quad (3)$$

$$K_i(r) = \begin{cases} C_n & (i = n) \\ C_i \times K_{(i+1)} \times K_{(i+2)} \times \cdots \times K_n & (i < n) \end{cases} \quad (4)$$

As shown by these equations, a classification item Ci is weighed with a product of all values applicable to subsequent smaller classification items. However, each value of $K_i$ (i=2, ..., n) depends on the value of $C_{i-1}$. Therefore, a larger classification for the element V is weighed with a larger value, and represented as k(r).

Using the weighed value k(r), the dissimilarity is obtained by the following equation (5).

In this case, a square root or absolute value of $$d(r_1, r_2) = \sqrt{\{k(r_1) - k(r_2)\}^2} \quad (5)$$

the difference between the weighed values k(r) for two optional records $r_1$ and $r_2$ is defined as a dissimilarity.

(4) When a display item refers to a sentence or text, such as titles and abstracts;

the dissimilarity is computed using the number of matching keywords (the number of words commonly used in the two records) after extracting a word as a keyword from each sentence.

Assuming that the sentence corresponding to the item a of the record $r_1$ contains the keyword of Wi (i=1, ..., n) while the record $r_2$ contains the keyword of Wj (j=1, ..., m), the dissimilarity is computed by the following equations (6) and (7).

$$d(r_1, r_2) = 1 \bigg/ \left( 1 + \sum_{i=1}^{n} \cdot \sum_{j=1}^{m} \text{same}(W_i, W_j) \right) \quad (6)$$

$$\text{same } (x, y) = \begin{cases} 0 & (x \neq y) \\ 1 & (x = y) \end{cases} \quad (7)$$

It is also possible to extract only the keywords included in a predetermined keyword list.

Furthermore, according to the method of Watanabe (A Divergent Thinking Support System "Keyword Associator" version 2, the 15th System Engineering Study Association of the Automatic Measurement Control Academy, pp9–16 (1994) by Isami Watanabe), words can be extracted with ordinary words excluded. The associative between the extracted keywords is first computed, and then the dissimilarity can be computed by equation (8) according to the associative.

$$d(r_1, r_2) = 1 \bigg/ \left( 1 + \sum_{i=1}^{n} \cdot \sum_{j=1}^{m} \text{associative } (W_i, W_j) \right) \quad (8)$$

The associative (Wi, Wj) is obtained as follows.

An n-dimensional (n indicates a total number of words) vector space is set with each word defined as a unit vector ω for all words in an input text information or a set of words extracted from the input text information. In the space, the text t is represented as a vector using the significance St(ω) as follows.

$$t_r=(St(\omega 1), St(\omega 2), \ldots, St(\omega n)) \quad (8')$$

where $t_r$ is normalized as being 1 in size.

$$t=t_r/|t_r| \quad (8'')$$

Using the value t, the associative ($\omega_i, \omega_j$) is represented by the following equation.

$$\text{associative } (\omega_i, \omega_j) = \sum_{k=1}^{r} (\omega_i \cdot t_k)(t_k \cdot \omega_j) \quad (8''')$$

where T indicates the number of texts. The significance St(ω) is determined based on the number of occurrences of a word. A predetermined associative dictionary contains synonyms and related keywords. By referring to the associative dictionary, an insignificant word can be removed prior to computing the dissimilarity.

Furthermore, the dissimilarity can be computed using the keyword list containing a set of keywords or words. In this case, the above described keyword extracting process is omitted. Otherwise, a retrieving method similar to the above described retrieval process is followed. Of the keywords extracted from the text and words in the keyword list, the synonyms defined by the associative dictionary can be processed as identical words. Furthermore, a dissimilarity can be computed using the associative for identifiers and proper nouns.

Described below is the case where a dissimilarity is determined based on a plurality of display items.

When a plurality of display items are designated, the dissimilarity between two records is obtained by the above described method for each item. Then, the average and dispersion values of the obtained dissimilarity are computed for each item. Using the average and dispersion values, the dissimilarity is normalized. The computed dissimilarities are added up to obtain a synthetic dissimilarity between two records.

If a plurality of items As ⊂ A (As≠φ) have been selected, the synthetic dissimilarity Dis ($r_1$, $r_2$) of the record $r_1$, $r_2 \in$ S in the retrieval data set S ⊂ R is computed by the following equation (9).

$$Dis(r_1, r_2) = \sum_{a \in As} \{(da(r_1, r_2) - E(da))/V(da)\} \quad (9)$$

In equation (9), da (da∈D) is the dissimilarity obtained using a dissimilarity computation function corresponding to the item a. E(da) and V(da) indicate the average and dispersion values of the dissimilarity da($r_i$, $r_j$) for $r_i$, $r_j \in$ S ($r_i \neq r_j$) respectively. The dissimilarities for respective items can be added up to obtain a synthetic dissimilarity.

The user can designate a weighing of W(a) for the item a ∈ As. In this case, the synthetic dissimilarity can be obtained by the following equation (10).

$$Dis(r_1, r_2) = \sum_{a \in As} W(a) \cdot \{(da(r_1, r_2) - E(da))/V(da)\} \quad (10)$$

Described below is the two-dimensional plotting process.

The two-dimensional plotting process is performed by a multidimensional scaling, such as the Kruskal method described in the following documents [1] and [2].

[1] J. B. Kruskal: "MULTIDIMENSIONAL SCALING BY OPTIMIZING GOODNESS OF FIT TO A NONMETRIC HYPOTHESES., PSYCHOMETRIKA, VOL. 29, No.1, pp 126 (1964).

[2] J. B. Kruskal: "NONMETRIC MULTIDIMENSIONAL SCALING: A NUMERICAL METHOD", PSYCHOMETRIKA, VOL.29, No.2 pp 115129 (1964).

According to the multidimensional scaling, the coordinate computation and record arrangement are performed in a way that the distance between data plotted on a two-dimensional plane reflects the difference between the given data.

Figure 4:
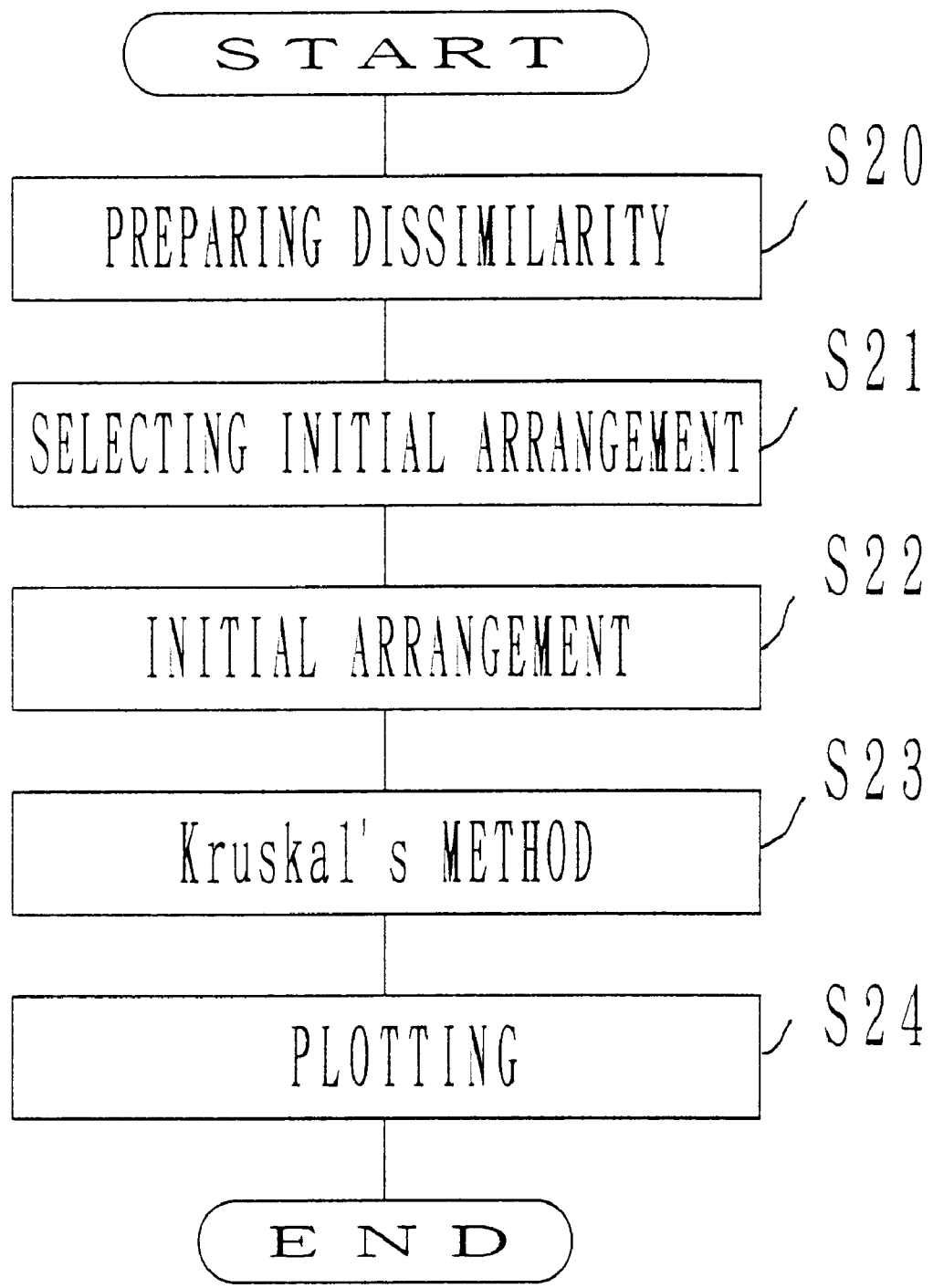
FIG. 4 is a flowchart showing the two-dimensional plotting process according to the database searching method of the present invention.

FIG. 4 is a flowchart showing the two-dimensional plotting process 11 shown in FIG. 2. When the two-dimensional plotting process starts, the dissimilarity obtained by the dissimilarity computing process is prepared (step S20), and then the initial arrangement is selected (step S21). In selecting an initial arrangement, either the arrangement in which records are plotted in line or a random arrangement is selected. Next, according to the selected arrangement method, the records in the retrieval data set are initially arranged (S22). Then, the initially arranged records are processed by the Kruskal method (step S23).

In the Kruskal method, the inconsistency between the order of distances between data in the initial arrangement and the order of the sizes of given differences is computed as a contradiction. An arrangement with smaller contradiction between the record arrangement and dissimilarity can be obtained by repeatedly amending the arrangement to reduce the contradiction. Based on the obtained arrangement coordinates, the records are finally plotted in two dimensions (step S24). The contradiction ranges from 0% to 100%. The records can be plotted in one dimension or three dimensions. When the user selects a record using a selecting device, etc., the contents of each item of the selected record can be displayed on the same screen or on different screens.

In the contradiction displaying process 12 shown in FIG. 2, the contradiction is displayed on the display screen. At this time, the contradiction can be displayed in one of the three following methods.

(1) A numerical value is displayed in the area where the record is plotted.

(2) A bar graph is displayed on either side of the screen where the record is displayed.

(3) The point or background of the plotted record is displayed in a different color.

In this case, a color-to-contradiction correspondence list can be displayed.

Described below is the object record process 13 shown in FIG. 2.

An object record to be retrieved is selected by the user from existing records in the database. The user newly generates a record with only the necessary items properly set to define it as an object record. The object record is displayed as being distinguished from other records on the screen where records are plotted. If the object record is improperly set, an appropriate object record can be selected and highlighted on the screen after removing the improper object record and repeating the processes by the above described methods. The object record can be selected from the records displayed on the screen using the selecting device, etc.

Described below is the new retrieval data set generating process 14 shown in FIG. 2.

Figure 5:
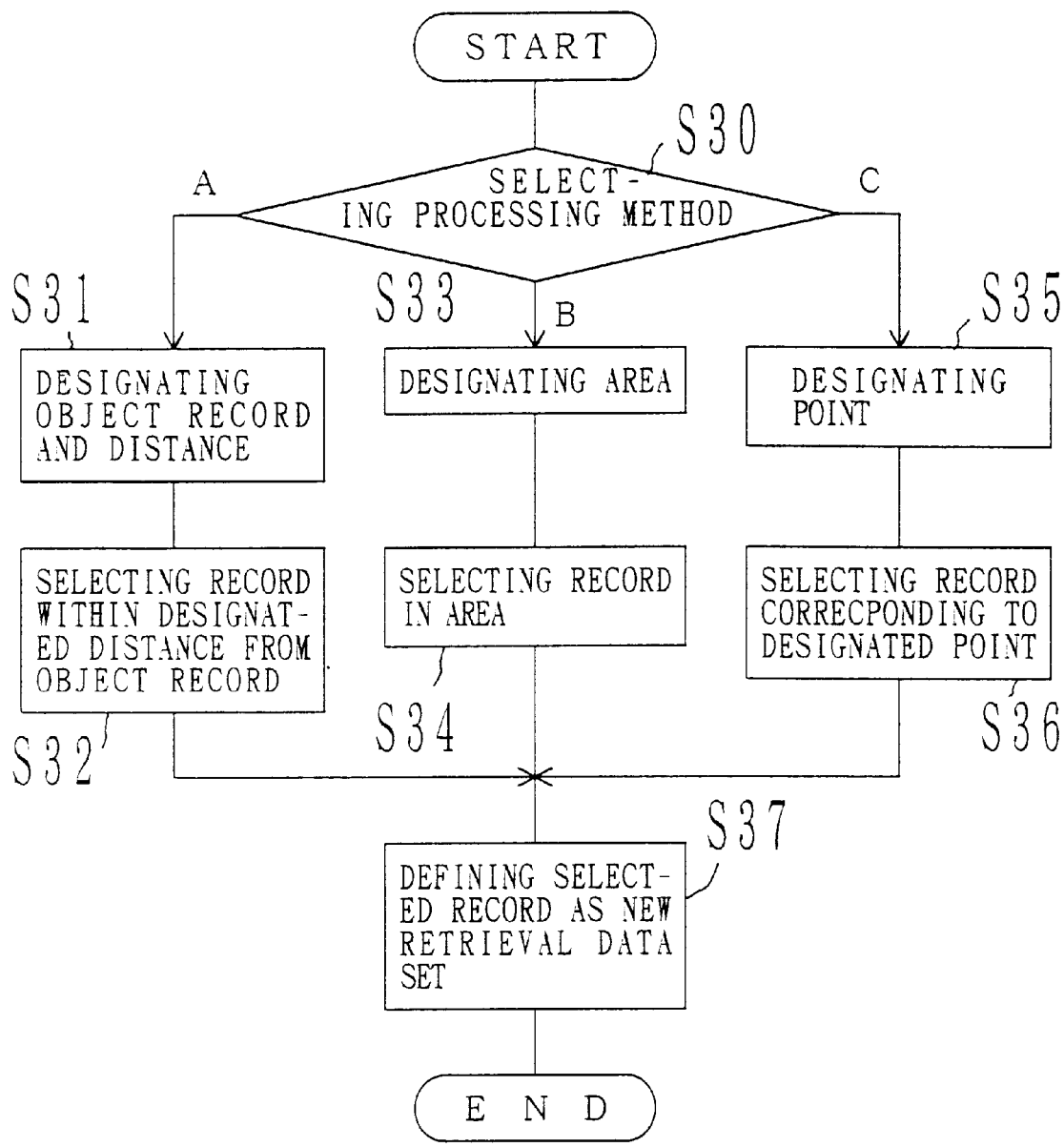
FIG. 5 is a flowchart showing the new retrieval data set generating process according to the database searching method of the present invention.

The generation of a new retrieval data set is controlled through the screen on which records are plotted. FIG. 5 is a flowchart showing a new retrieval data set generating process.

In the new retrieval data set generating process, the user first selects one of the three following methods as the new retrieval data set generating process (step S30). In the first method A, the user designates an object record and distance (step S31), and automatically selects the record plotted in a circle having the object record as its center and having its radius equal to the designated distance (step S32).

In the second retrieving method B, the user designates an optional area on the screen by referring to the object record (step S33), and selects a record in the designated area (step S34). The area can be designated by the user by enclosing an optional area using a selecting device.

In the third retrieving method C, the user designates an optional point on the screen (step S35), and selects the record indicated by the designated point (step S36). The point can be designated using the seleting device.

Then, the record set selected by one of the above described three methods is defined as a new retrieval data set (step S37).

The new retrieval data set is generated by referring to the displayed contradiction. To efficiently select a record having a high associative with the object record, a comparatively small area should be selected when the contradiction is smaller, that is, when the reliability is high. When the contradiction is larger, a comparatively large area should be designated when designating a record.

According to the present embodiment, the following method can be followed to select a display item more appropriate for retrieval. First, two or more object records are defined, and the records are displayed in two dimensions with a display item designated. Then, one or more display items are repeatedly selected to move the two object records closer to each other. When the two objects are the closest to each other, the subsequent retrieval is performed using the one or more display items obtained.

Described below is an example of displaying data on the screen by the above described retrieving method.

First, a preliminary retrieval is performed by the conventional retrieving method. For example, a retrieval data set containing 52 records has been obtained by repeating the retrieval of keywords for the items of names and abstracts.

As a result of the preliminary retrieval, it is found that the records numbered 0016 and 0038 are the necessary records. Therefore, these records are designated as object records.

Figure 6:
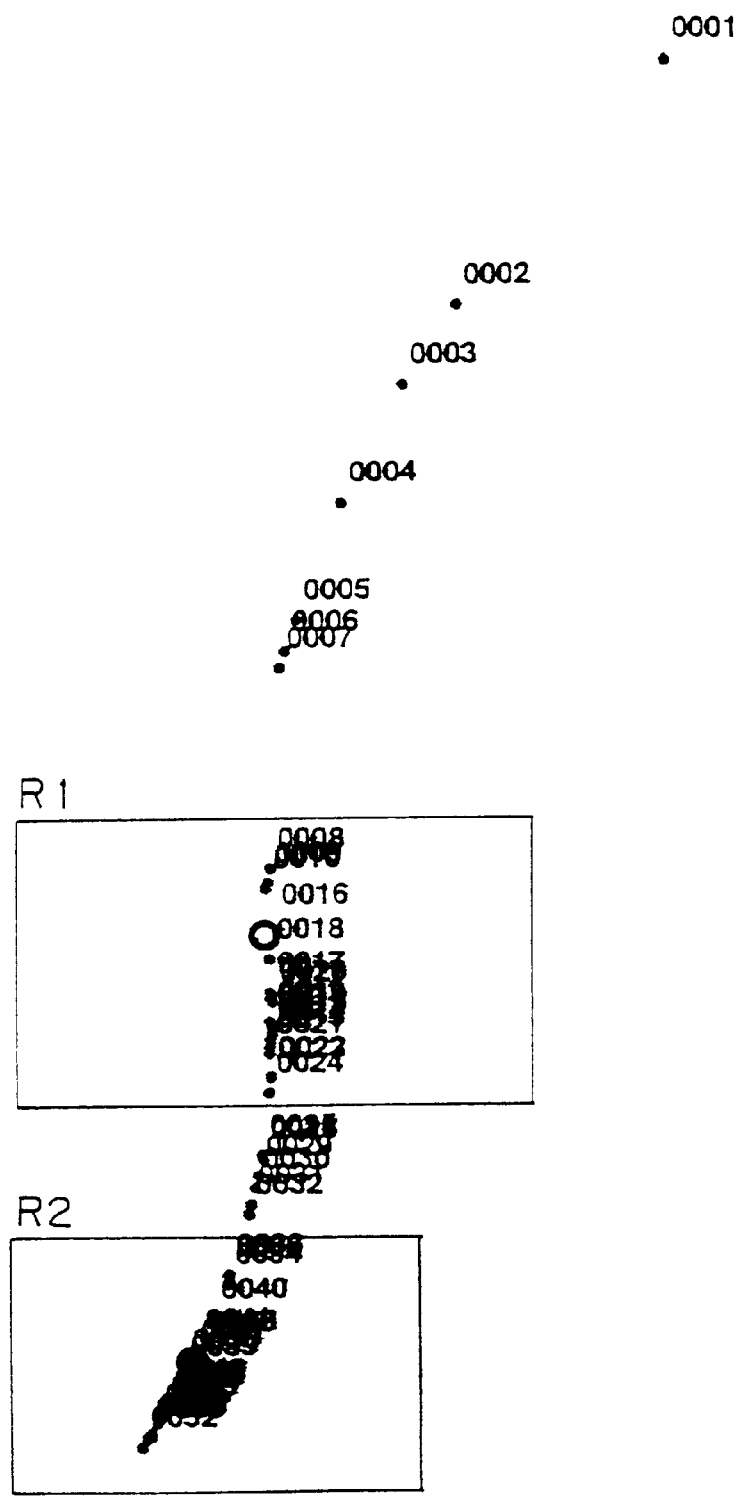
FIG. 6 shows an example of the display of the retrieval data set when only the application filing date is designated in the database searching method according to the present embodiment.
Figure 7:
FIG. 7 is an enlarged view of the peripheral area R1 of the object record 0016 shown in FIG. 6.
Figure 7:
Figure 7:
Figure 7:
Figure 7:
Figure 7:
Figure 8:
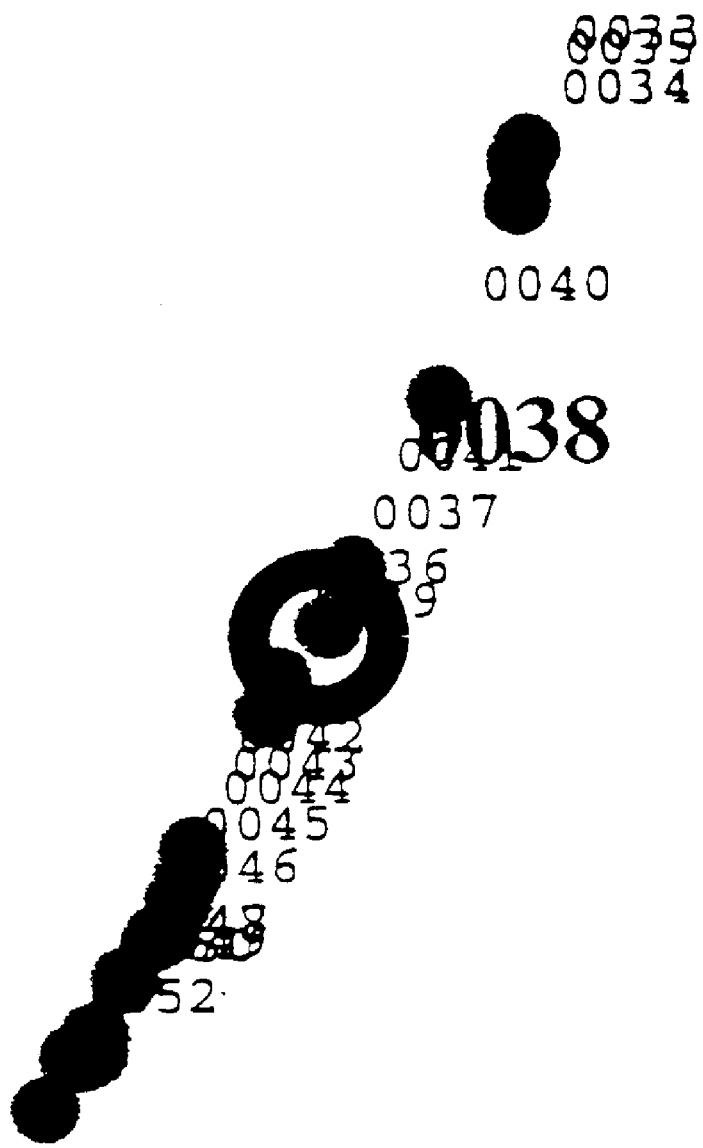
FIG. 8 is an enlarged view of the peripheral area R2 of the object record 0038 shown in FIG. 6.

FIG. 6 shows a display result of the above described retrieval data set used when only the application filing date is designated as a display item. The contradiction on this display is 0.24253%. The points in the figure indicate a plotted record, and the digits indicate record numbers. The bold circle in the figure indicates an object record. FIG. 7 is an enlarged view of the area R1 around the object record 0016 shown in FIG. 6. FIG. 8 is an enlarged view of the area R2 around the object record 0038.

Figure 9:
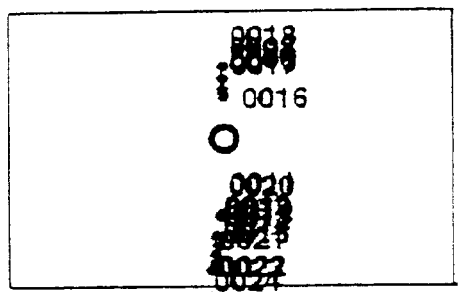
FIG. 9 shows an example of the display of the retrieval data set when only the publication date is designated in the database searching method according to the present embodiment.
Figure 9:
Figure 10:
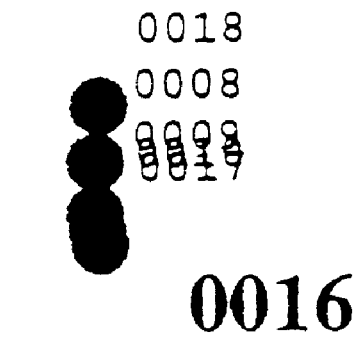
FIG. 10 is an enlarged view of the peripheral area R3 of the object record 0016 shown in FIG. 9.
Figure 10:
Figure 10:
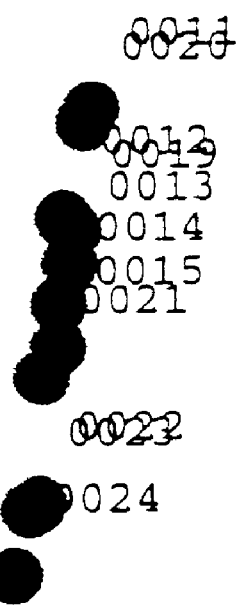
Figure 11:
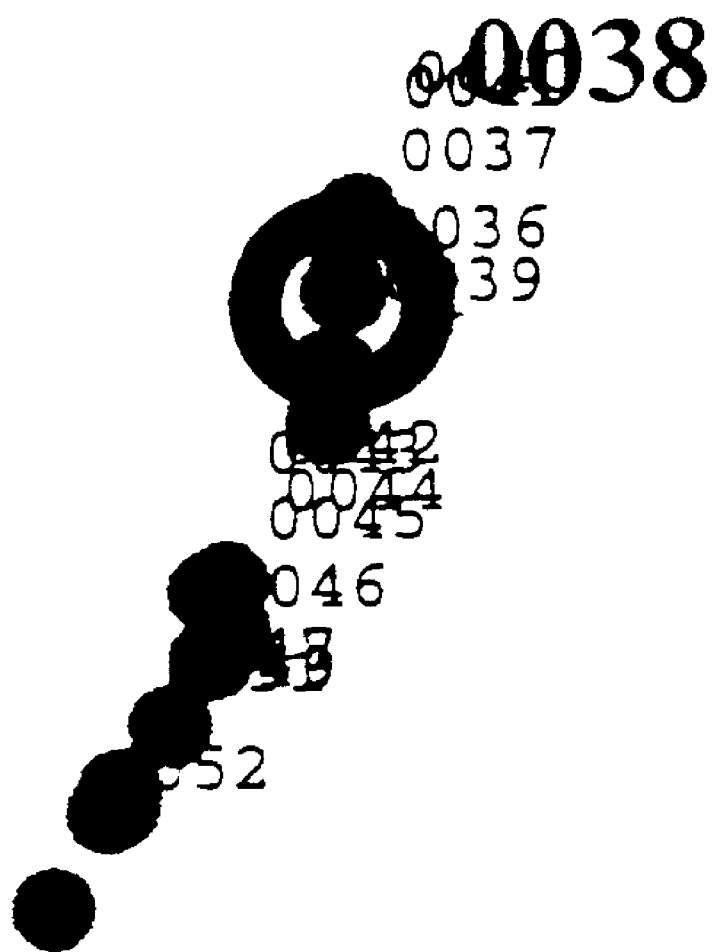
FIG. 11 is an enlarged view of the peripheral area R4 of the object record 0038 shown in FIG. 9.

FIG. 9 shows a display result of the above described retrieval data set used when only the publication date is designated as a display item. The contradiction on this display is 0.24353%. FIG. 10 is an enlarged view of the area R3 around the object record 0016 shown in FIG. 9. FIG. 11 is an enlarged view of the area R4 around the object record 0038.

Figure 12:
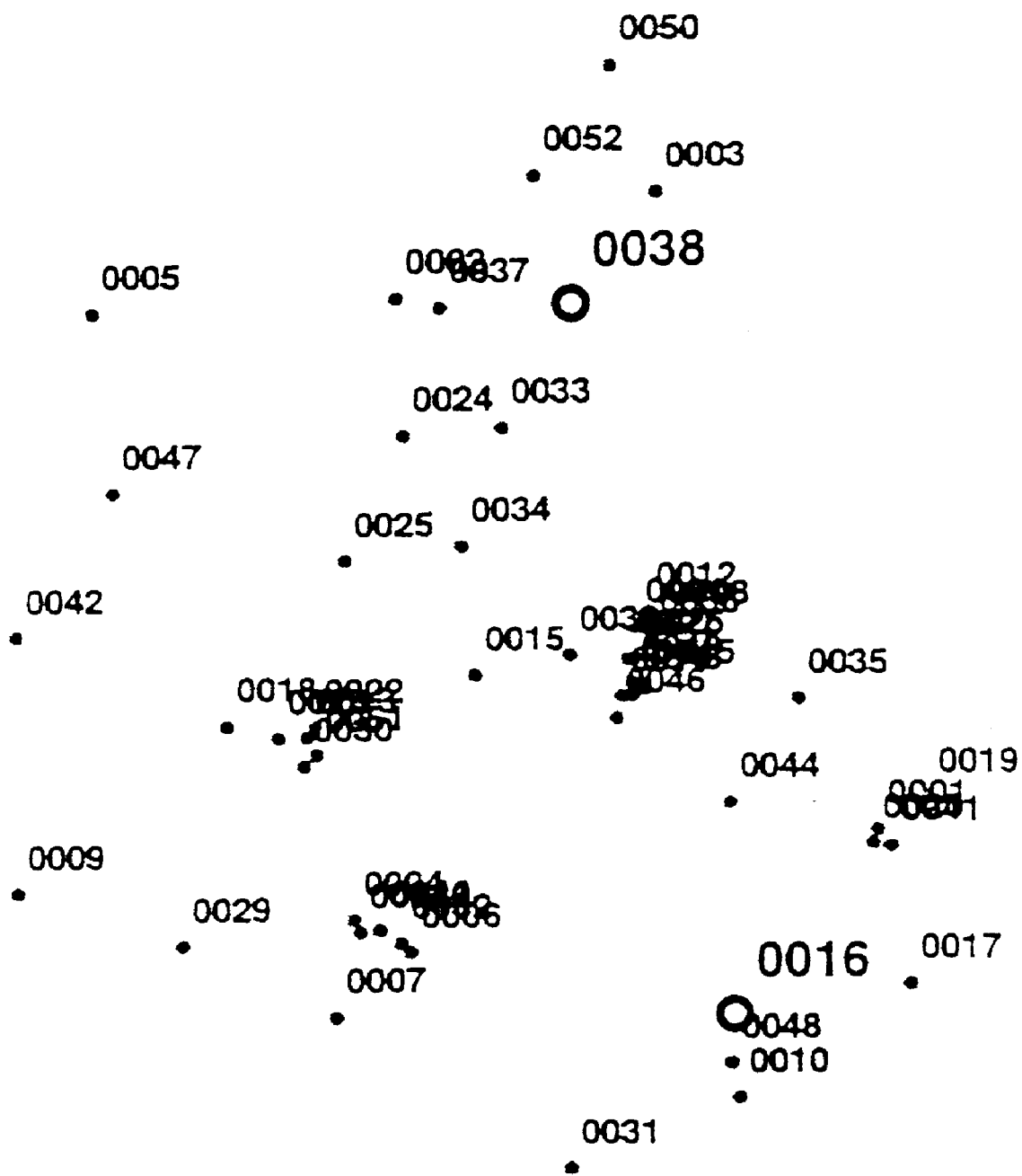
FIG. 12 shows an example of the display of the retrieval data set when only the Applicant is designated in the database searching method according to the present embodiment.

FIG. 12 shows a display result of the above described retrieval data set used when only the applicant is designated as a display item. The contradiction on this display is 0.0%.

Figure 13:
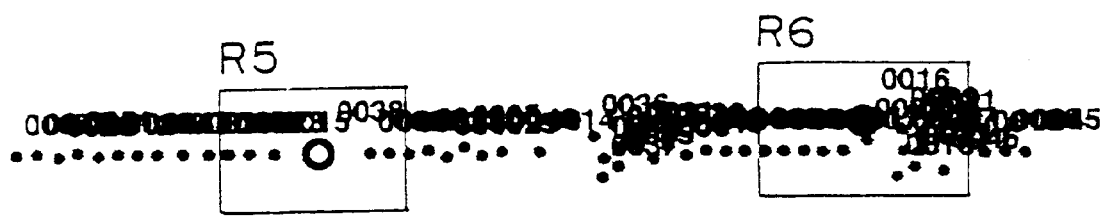
FIG. 13 shows an example of the display of the retrieval data set when only the Inventor is designated in the database searching method according to the present embodiment.
Figure 14:
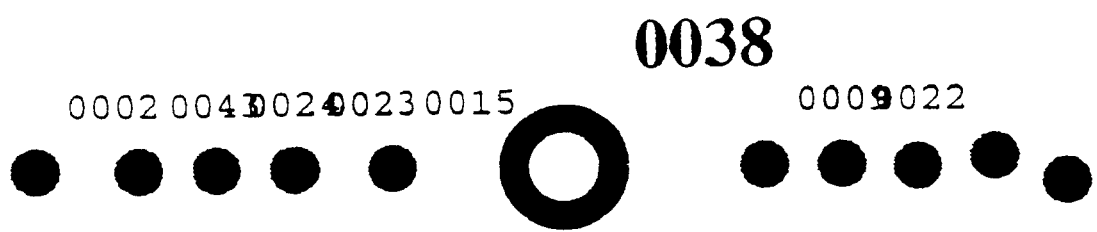
FIG. 14 is an enlarged view of the peripheral area R5 of the object record 0038 shown in FIG. 13.
Figure 15:
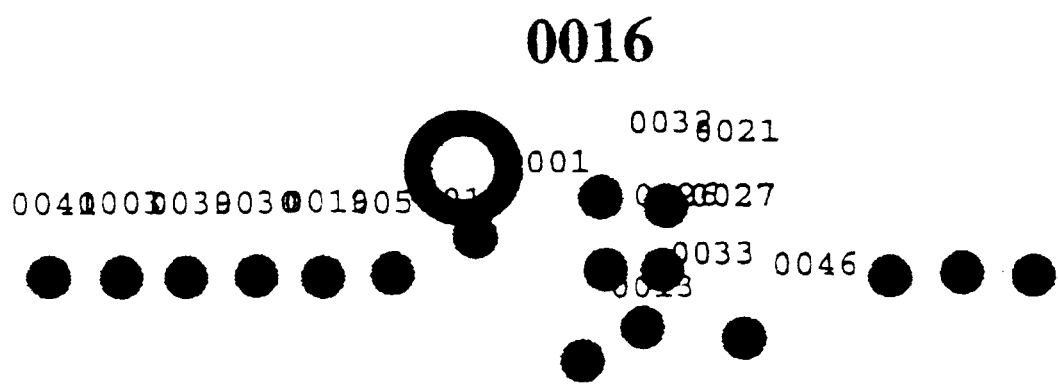
FIG. 15 is an enlarged view of the peripheral area R6 of the object record 0016 shown in FIG. 13.

FIG. 13 shows a display result of the above described retrieval data set used when only the inventor is designated as a display item. The contradiction on this display is 0.0%. FIG. 14 is an enlarged view of the area R5 around the object record 0038 shown in FIG. 13. FIG. 15 is an enlarged view of the area R6 around the object record 0016.

Figure 16:
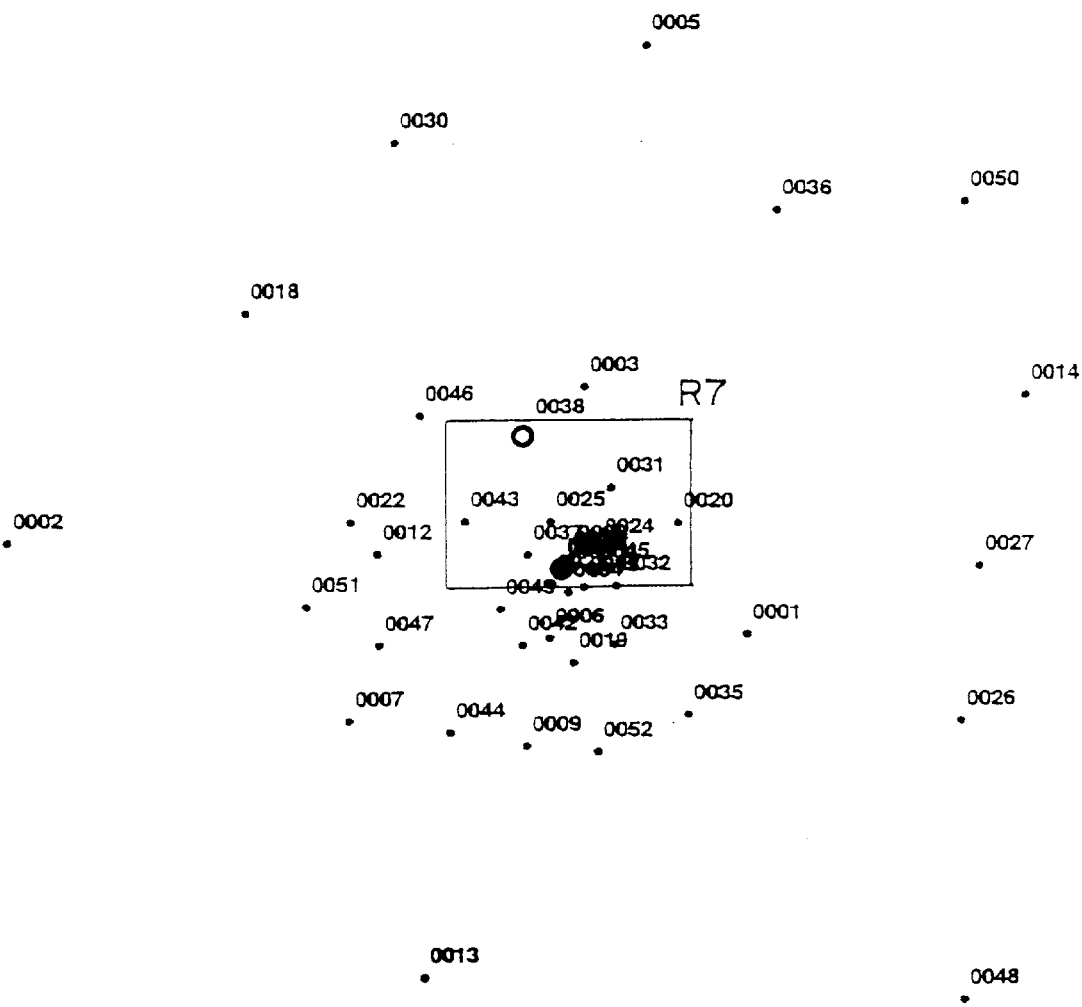
FIG. 16 shows an example of the display of the retrieval data set when only the international patent classification code is designated in the database searching method according to the present embodiment.
Figure 17:
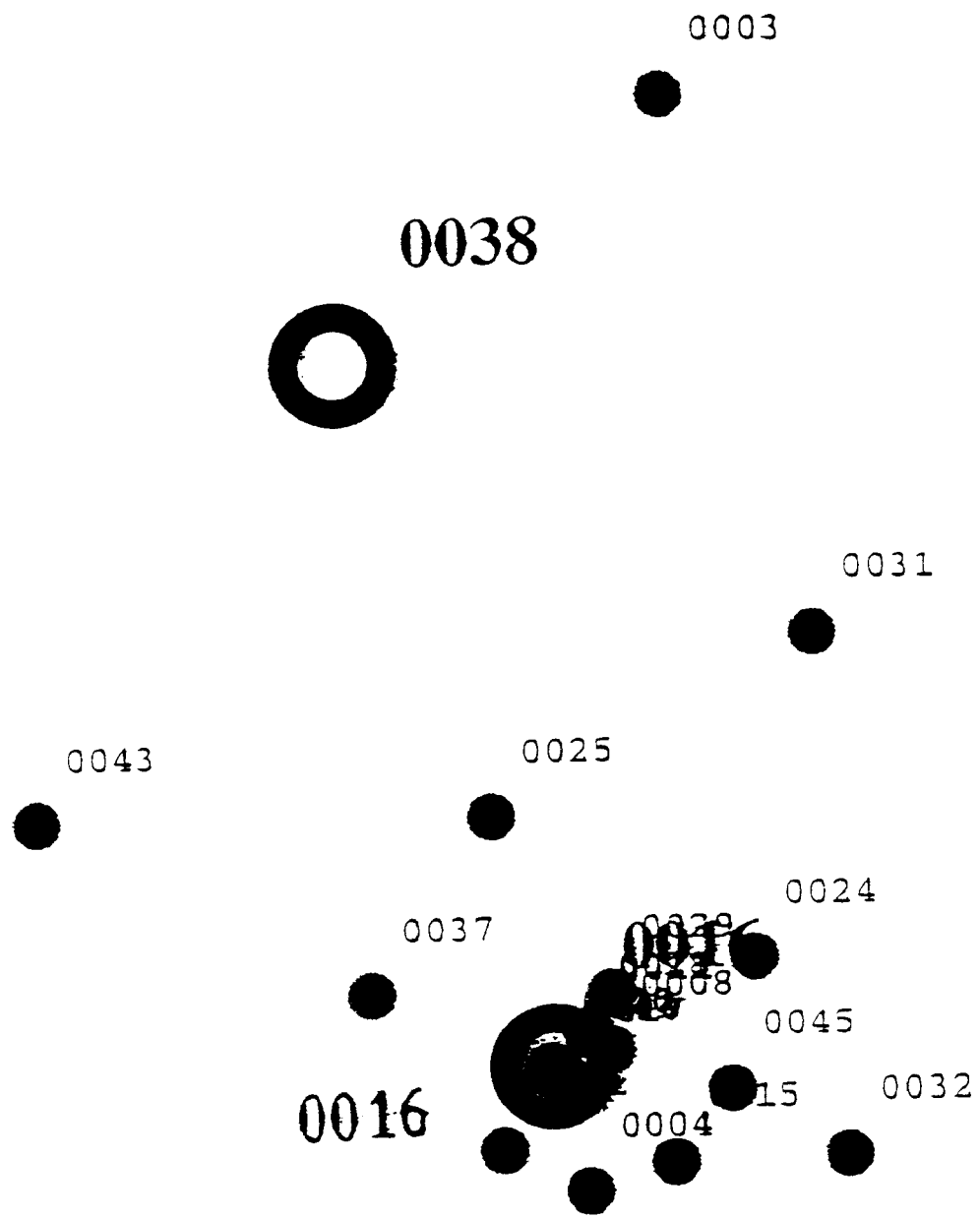
FIG. 17 is an enlarged view of the peripheral area R7 of the object records 0016 and 0038 shown in FIG. 16.

FIG. 16 shows a display result of the above described retrieval data set used when only the international patent classification code is designated as a display item. The contradiction on this display is 22.8363%. FIG. 17 is an enlarged view of the area R7 around the object records 0016 and 0038 shown in FIG. 16. In this display, the two object records are plotted close to each other.

Figure 18:
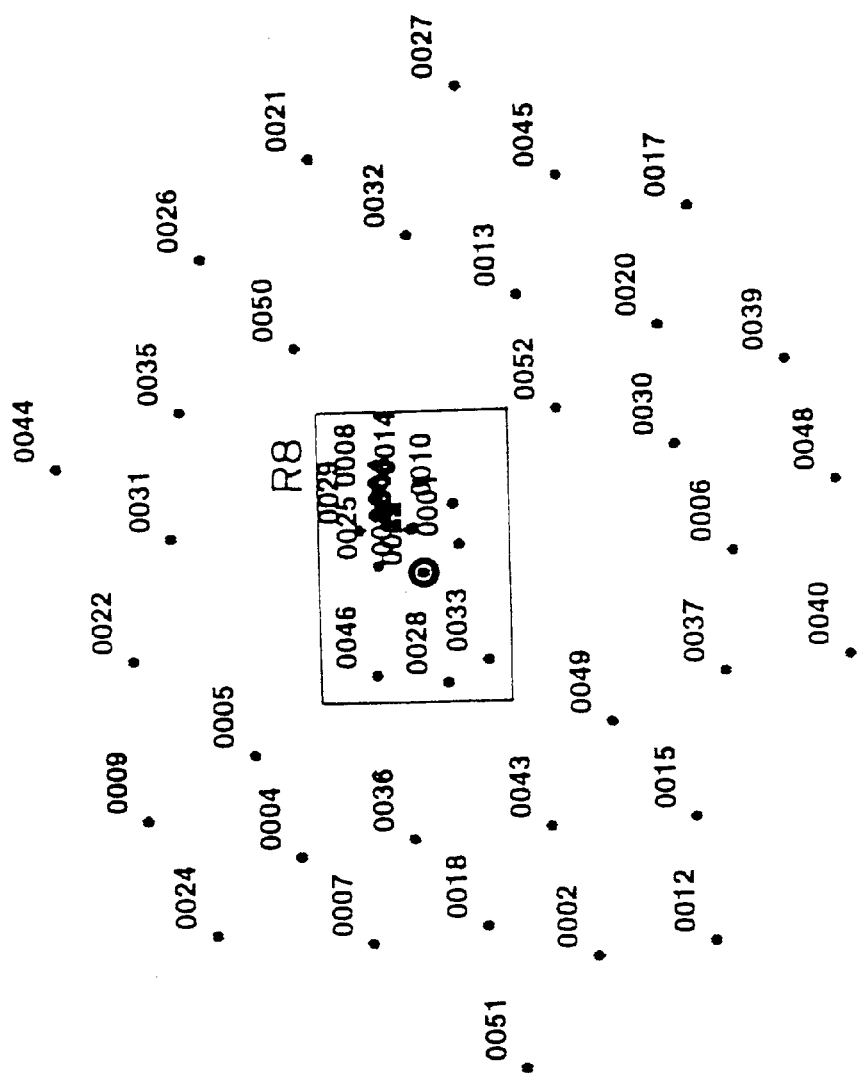
FIG. 18 shows an example of the display of the retrieval data set when only the name is designated in the database searching method according to the present embodiment.
Figure 19:
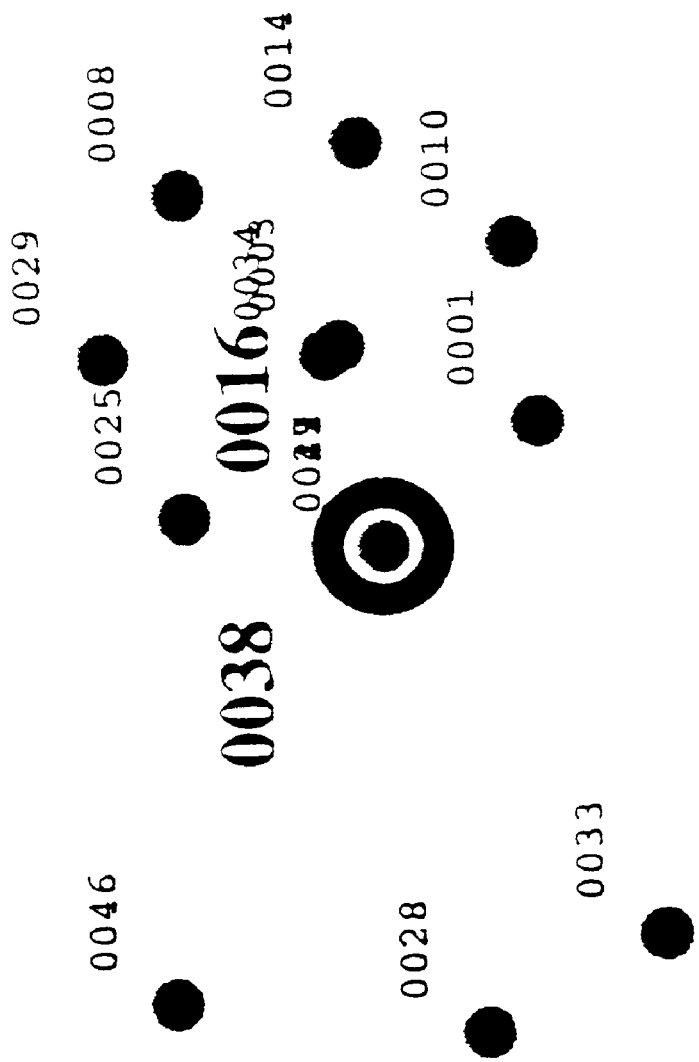
FIG. 19 is an enlarged view of the peripheral area R8 of the object records 0016 and 0038 shown in FIG. 18.

FIG. 18 shows a display result of the above described retrieval data set used when only the title is designated as a display item. The contradiction on this display is 0.0910077%. FIG. 19 is an enlarged view of the area R8 around the object records 0016 and 0038 shown in FIG. 18. In this display, the two object records are plotted on the same point.

Figure 20:
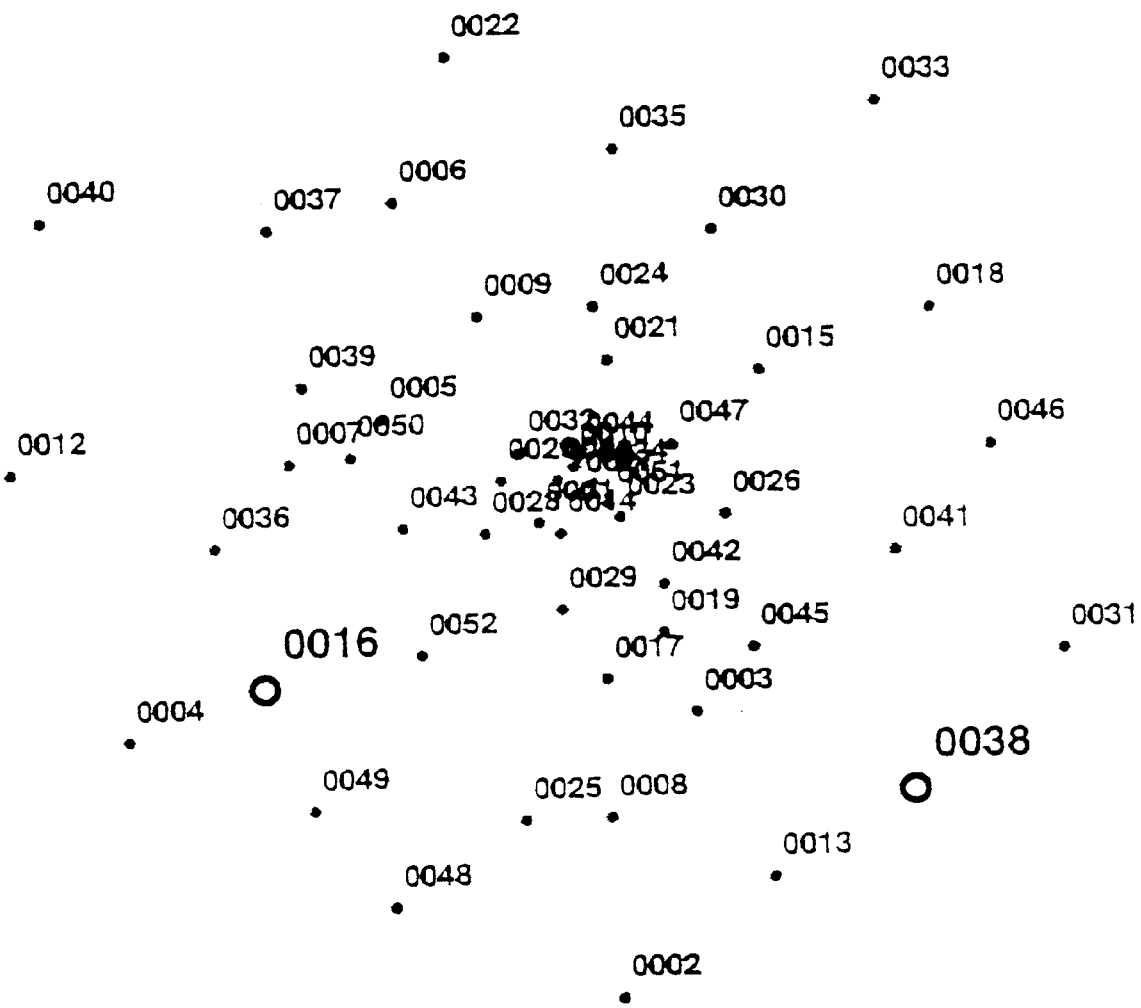
FIG. 20 shows an example of the display of the retrieval data set when only the abstract is designated in the database searching method according to the present embodiment.

FIG. 20 shows a display result of the above described retrieval data set used when only the abstract is designated as a display item. The contradiction on this display is 27.8011%.

Figure 21:
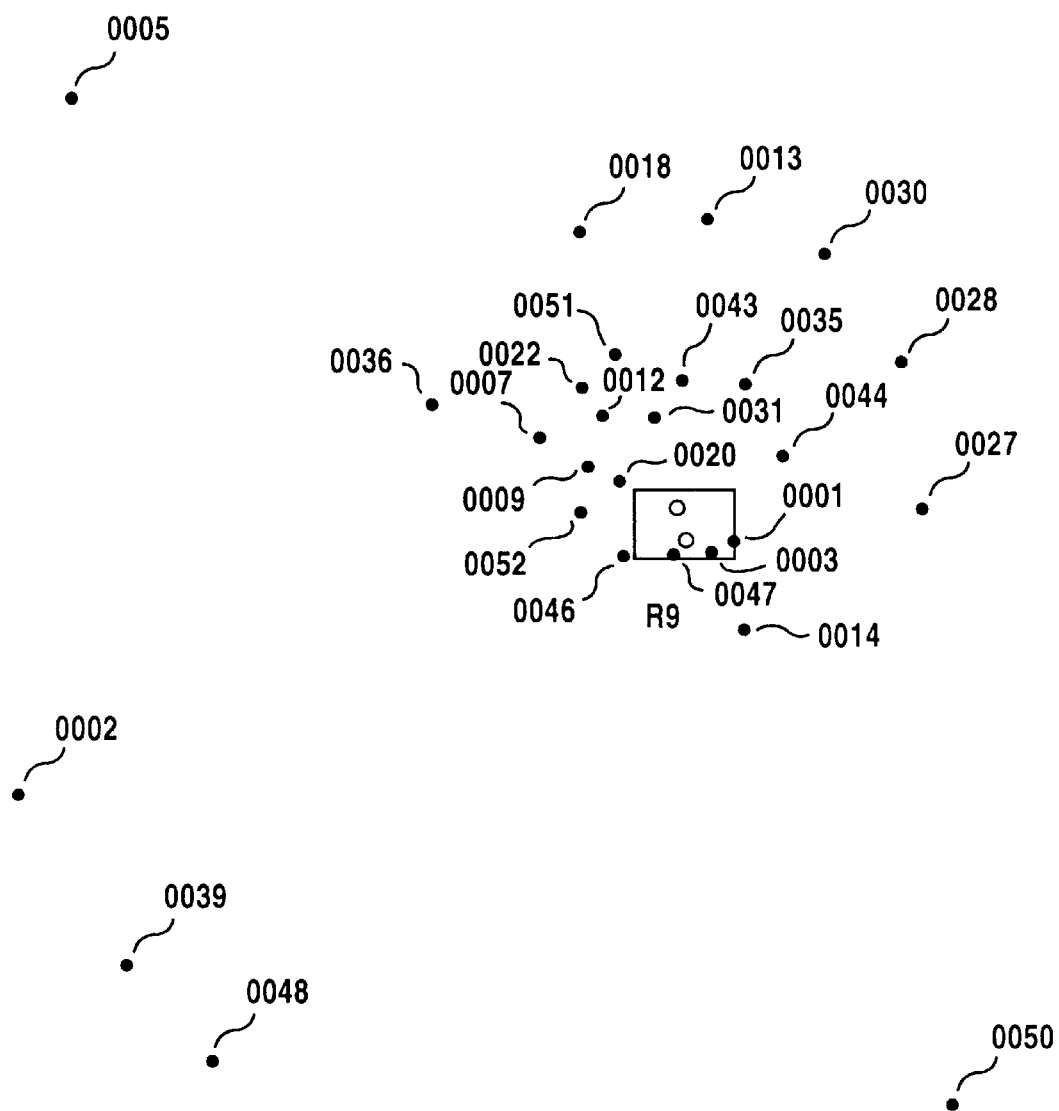
FIG. 21 shows an example of the display of the retrieval data set when the international patent classification code and name are designated in the database searching method according to the present embodiment.
Figure 22:
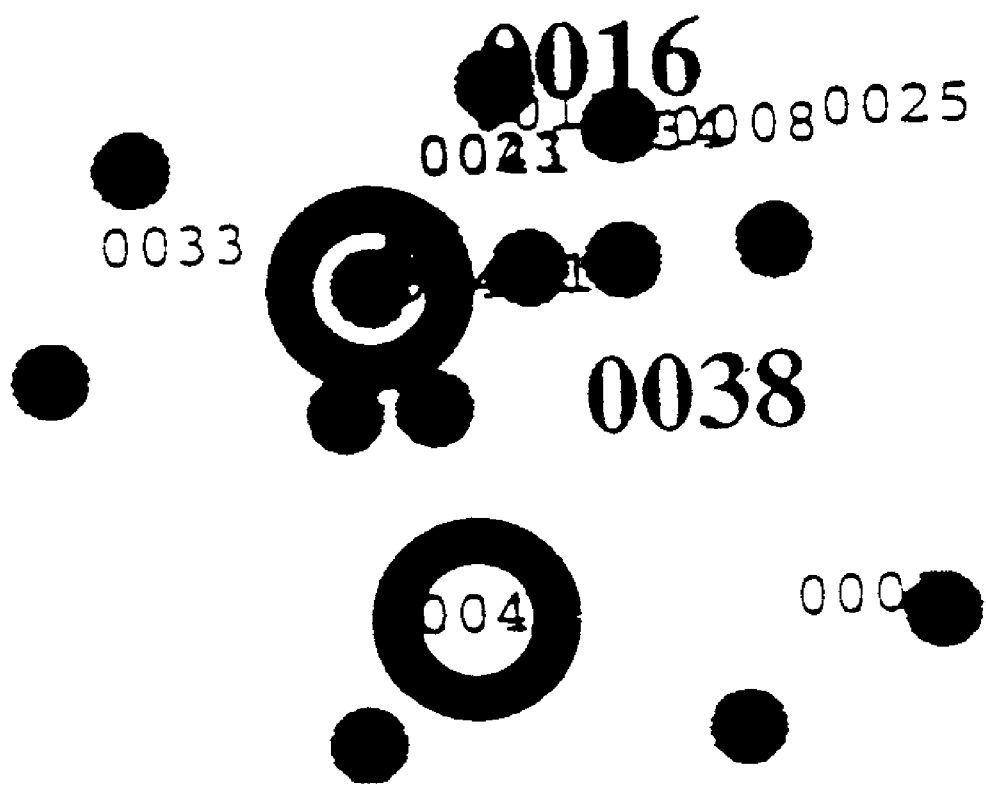
FIG. 22 is an enlarged view of the peripheral area R9 of the object records 0016 and 0038 shown in FIG. 21.

According to the display examples shown in FIGS. 6 through 20, the object records are plotted closely when the international patent classification code or title is designated. FIG. 21 shows an example of displaying the retrieval data set by designating the international patent classification code and name as display items by referring to the above described display results. FIG. 22 is an enlarged view of the area R9 around the object records 0016 and 0038 shown in FIG. 21.

According to the display example shown in FIG. 21, the record having a lesser relationship with the object record is plotted away from the object record relating to the international patent classification code and title. The contradiction is 14.4301%, which is not so low. Based on the retrieval result, a new retrieval data set is generated by selecting only the records closely arranged around the object record. The subsequent retrieval can be performed using the new retrieval data set without including unnecessary records.

Described next is a process of generating a retrieval data set by selecting a record using the object record. The method of selecting a record according to the present embodiment is one of the following methods.

Figure 23:
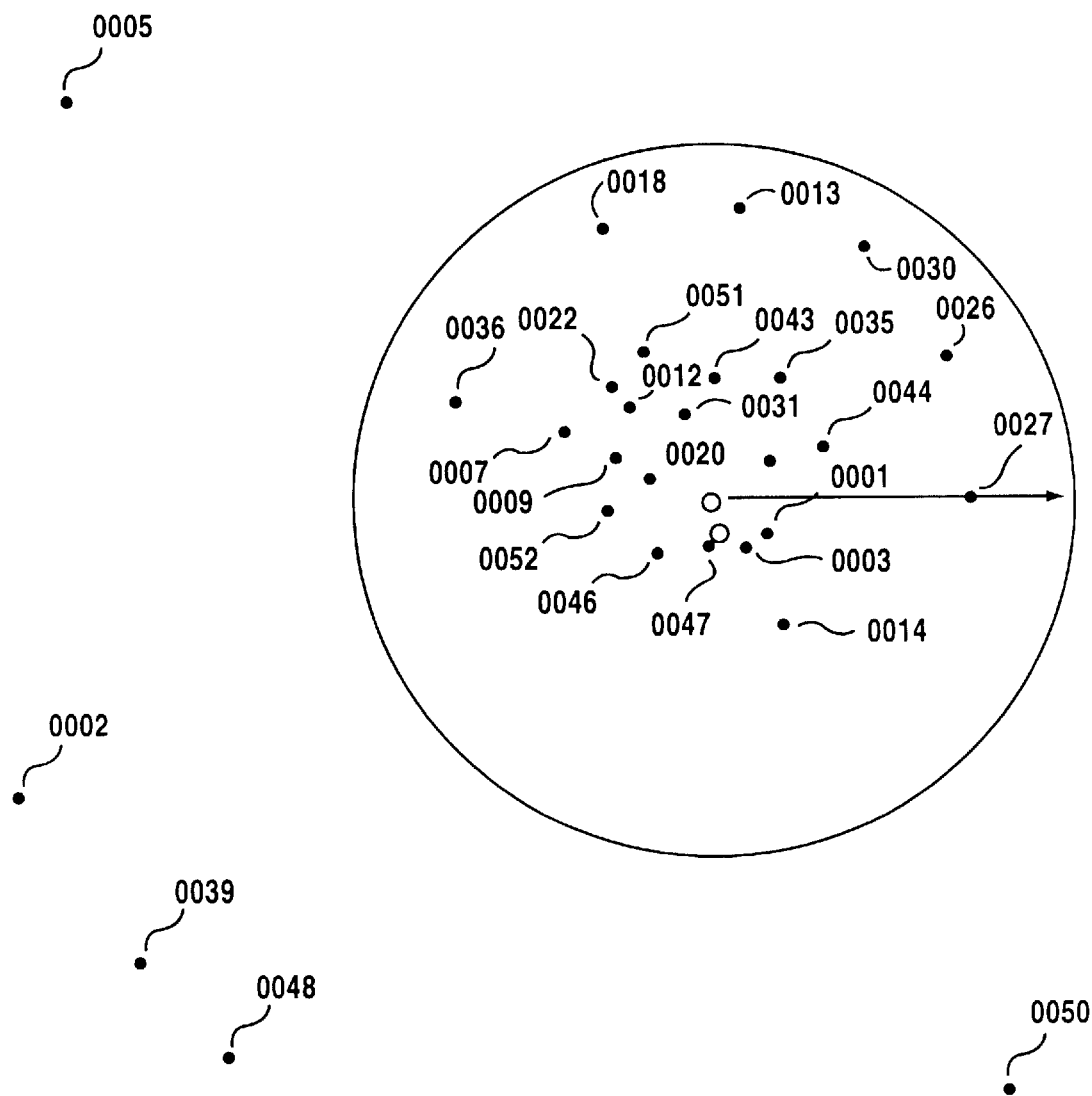
FIG. 23 shows an example of selecting a record by designating the object record and distance in the database searching method according to the present embodiment.

FIG. 23 shows the screen displayed when a record is selected by the first selecting method. According to this method, when the user designates an object record and distance (the length of the arrow shown in FIG. 23), the system displays on the screen a circle having the designated object record as its center with the designated distance defined as its radius. Then, the system collects the records contained in the displayed circle as a new retrieval data set.

Figure 24:
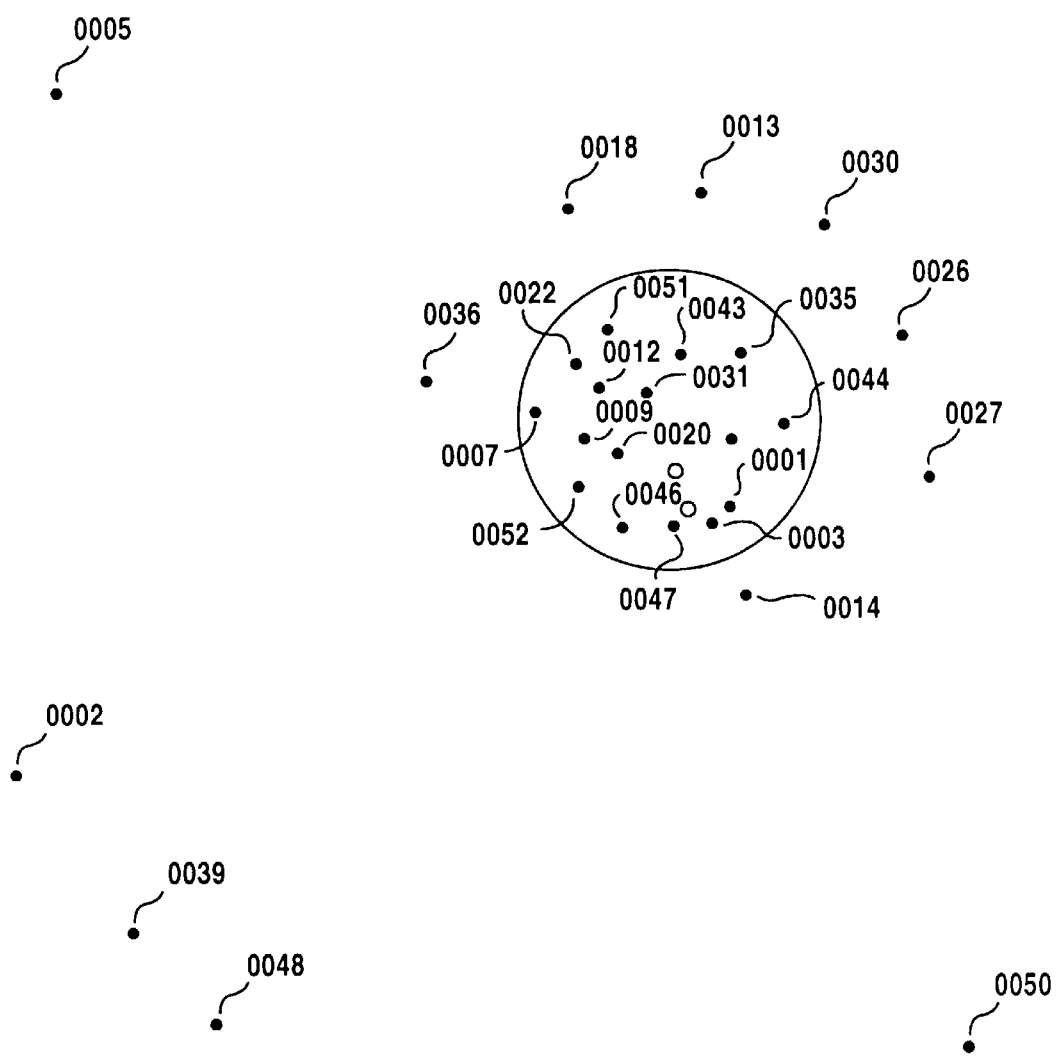
FIG. 24 shows an example of selecting a record by designating the area in the database searching method according to the present embodiment.

FIG. 24 shows the screen displayed when a record is selected by the second selecting method. According to this method, when the user designates an area (the encircled area in FIG. 24) on the display screen using a selecting device such as a mouse, etc., the system collects the records in this area and generates a new retrieval data set.

Figure 25:
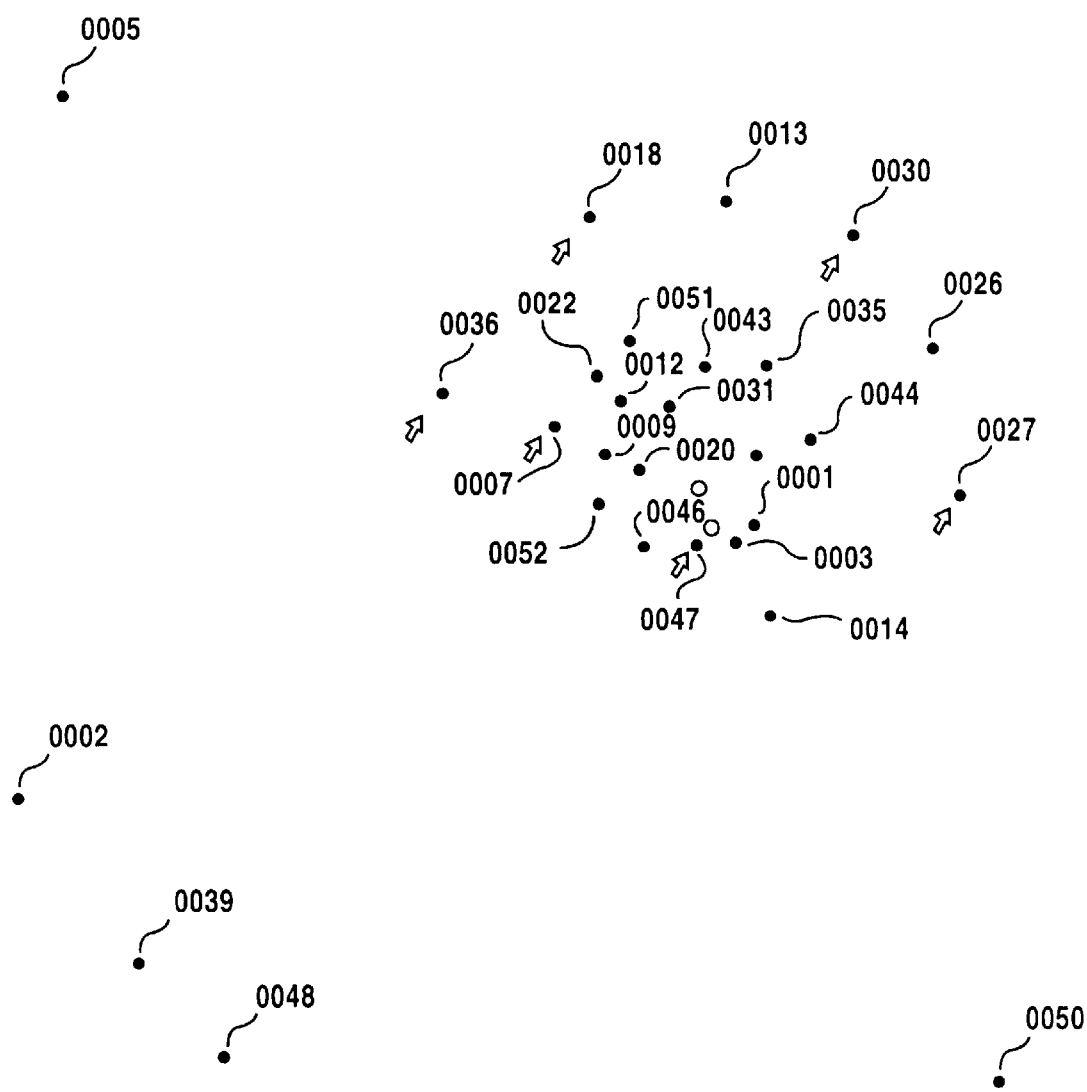
FIG. 25 shows an example of selecting a record by pointing to an object record in the database searching method according to the present embodiment.

FIG. 25 shows the screen displayed when a record is selected by the third selecting method. According to this method, when the user directly designates a record displayed on the screen (indicated by the arrow in FIG. 25) using a selecting device such as a mouse, etc., a new retrieval data set is generated with the designated record.

Next, the display of contradiction is described by referring to a practical example.

Figure 26:
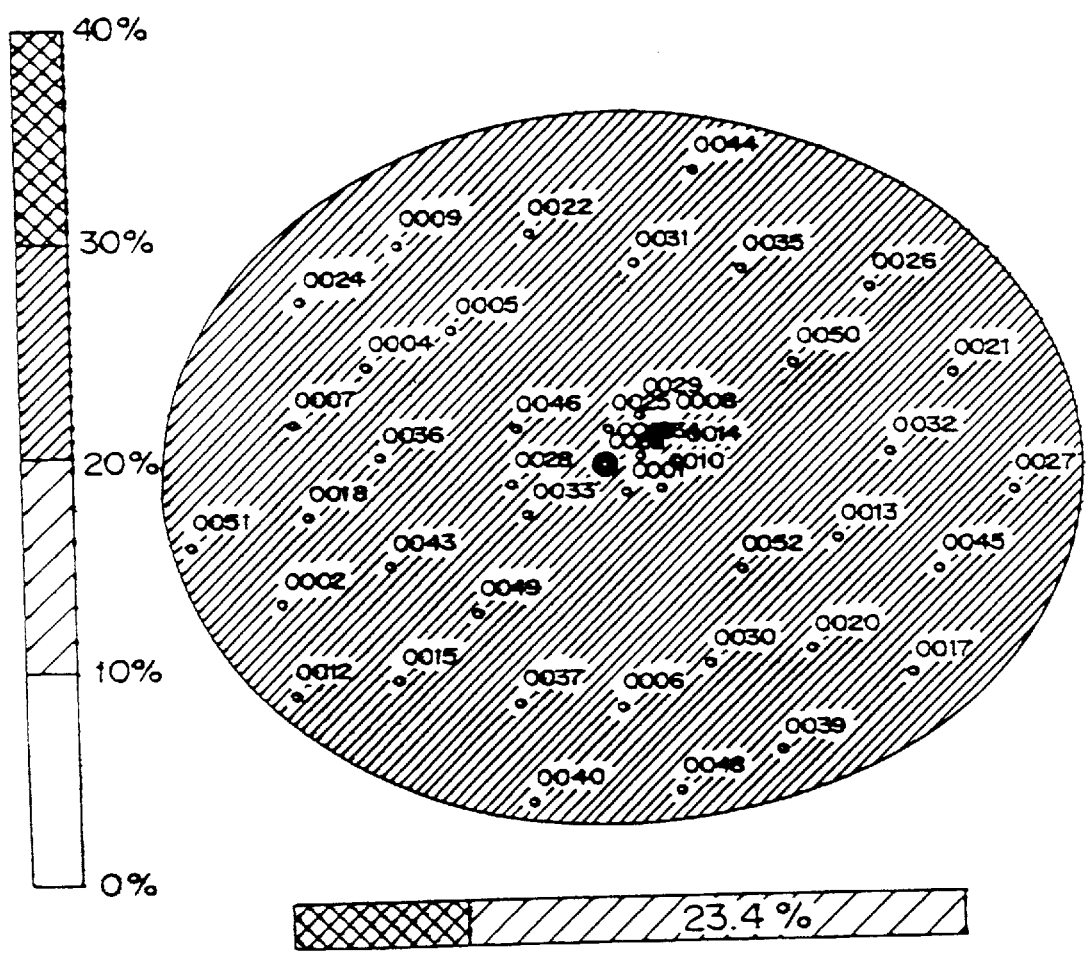
FIG. 26 shows an example of displaying a retrieval data set when the contradiction is large in the database searching method according to the present embodiment.
Figure 27:
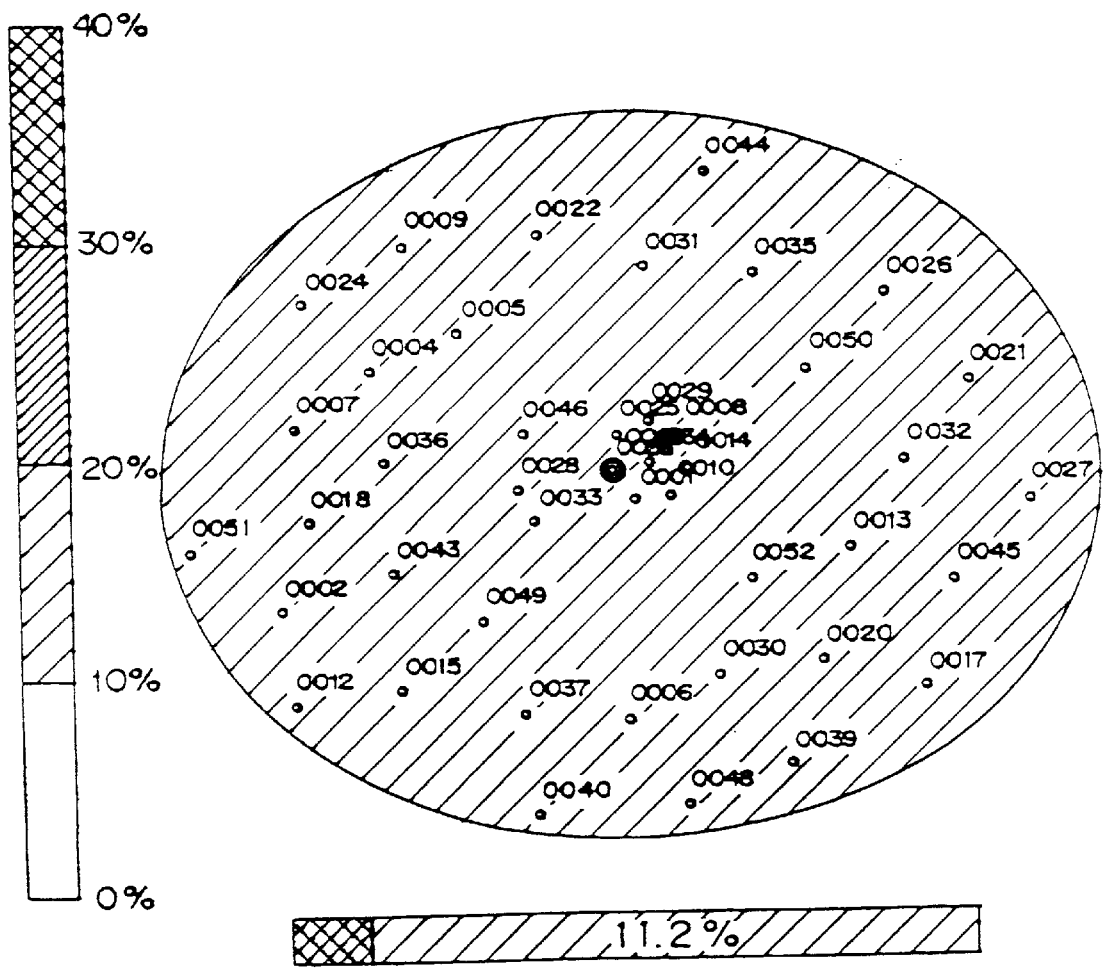
FIG. 27 shows an example of displaying a retrieval data set when the contradiction is medium in the database searching method according to the present embodiment.
Figure 28:
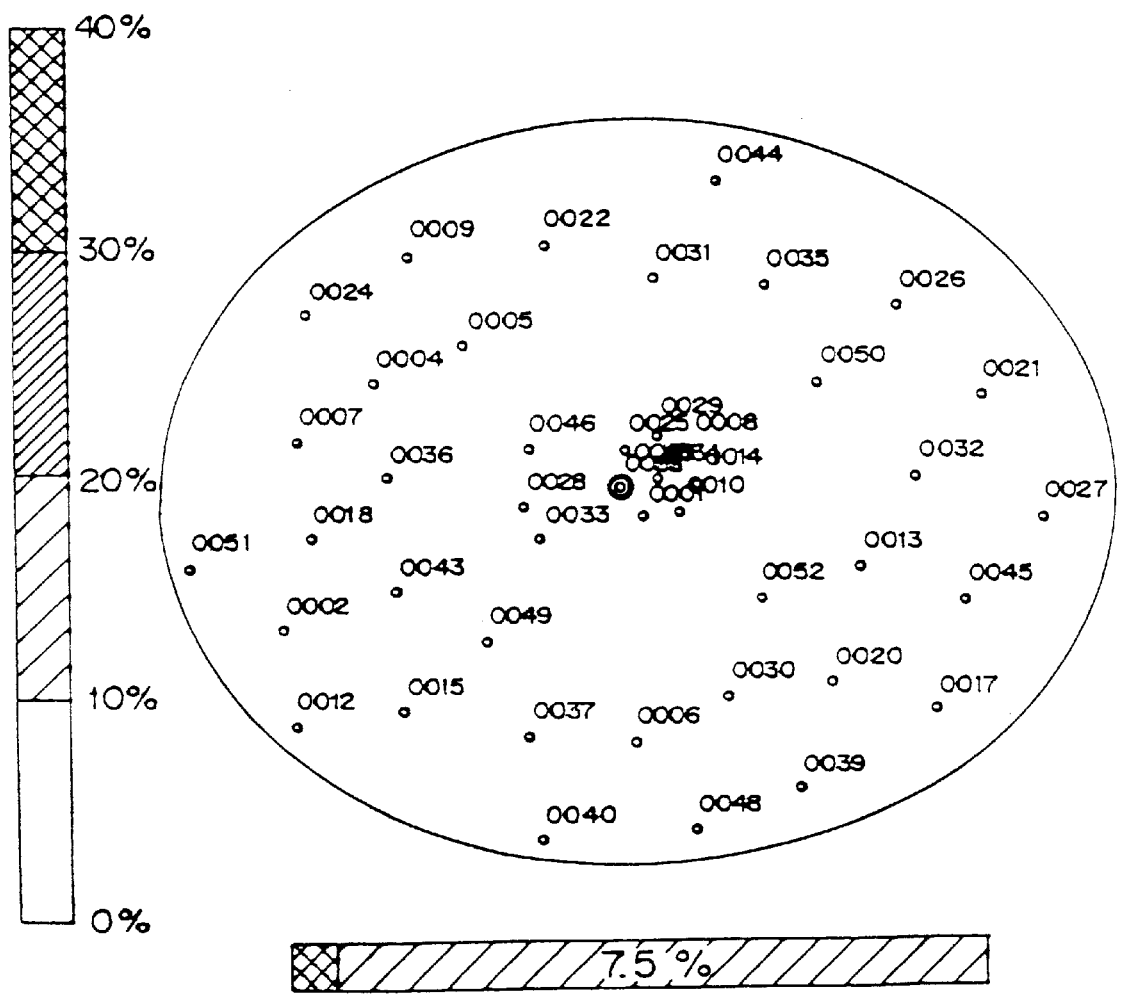
FIG. 28 shows an example of displaying a retrieval data set when the contradiction is small in the database searching method according to the present embodiment.

FIGS. 26, 27, and 28 show display examples of a large, medium, and small contradiction respectively. The numbers in the box at the lower portion of the figures indicate the contradiction. The box also functions as a bar graph indicating the contradiction by the ratio of the left pattern extending from the left end of the box, to the full length of the box. Records are indicated in the oval portions in FIGS. 26, 27, and 28, and the density of each background of each oval also indicates the contradiction. The correspondence between the density of the background and the contradiction is represented by the box on the left in each figure. It is also possible to represent the contradiction by various colors of the oval portion, and represent the relationship between each color and a contradiction level using the box on the left side.

According to the data base searching method, the misretrieval and generation of noise can be simultaneously reduced when a retrieval data set is generated. The retrieval data set can contain a large number of records. Since each record can be plotted with the dissimilarity between records displayed on the screen, the records not related to the retrieval can be easily detected using the retrieval data set, and the object record can be successfully retrieved in a short time.

According to the database searching method of the present invention, a large number of records can be displayed with the associative between records clearly displayed. Therefore, the retrieval can be continuously performed even if it is performed with a retrieval item and conditions amended when a new retrieving method is adopted, thereby improving the retrieval efficiency. Furthermore, since the dissimilarity between records can be displayed in consideration of a plurality of items, the retrieval efficiency can be successfully improved.

The database searching method can also display on the screen the retrieval data set corresponding to a designated item. Therefore, relating to the designated item, the records closely related to the object record can be easily detected. If the user is informed of the retrieval data set and object record, then the relationship between the retrieval data set and object record can be derived by displaying the retrieval data set using another item. Accordingly, the user can be easily informed which item should be designated to retrieve the most appropriate record. Since trials can be easily performed to specify a retrieval item as described above, the user can quickly learn how to specify a retrieval item according to the present invention. As a result, the user can quickly process data when different databases are used for various purposes.

What is claimed is:

1. A database searching method for searching a database having records including information about a plurality of items, comprising the steps of:
   generating a retrieval data set by selecting a plurality of records from the database;
   designating an item in the plurality of items as a display item;
   specifying an item element corresponding to the display item in the plurality of records in the retrieval data set;
   numerically representing a difference between the item elements of two records in the plurality of records contained in the retrieval data set as a dissimilarity;
   plotting and displaying the plurality of records in a way that the dissimilarity corresponds to a distance between the two records; and
   displaying a contradiction which is a value indicative of a degree of inconsistency between a positional arrangement of the plurality of plotted records and a numerical value of the dissimilarity.

2. The database searching method according to claim 1, further comprising the steps of:
   specifying a record in the plurality of records as an object record;
   selecting a record group from the plurality of plotted records on the basis of the object record; and
   retrieving a record from the selected record group.

3. The database searching method according to claim 1, wherein
   the plurality of records are plotted on a two-dimensional plane; and
   the dissimilarity corresponds to the distance between the two records on the two-dimensional plane.

4. The database searching method according to claim 1, wherein
   when the display item refers to a quantitative item, the dissimilarity is represented as a square root of a difference of quantities represented by the item elements of the two records.

5. The database searching method according to claim 1, wherein
   when the display item refers to an item including a plurality of categories, the item element of the plurality of records is weighed and numerically represented in such a way that a portion corresponding to a larger category in the element is heavier in weight, and
   the dissimilarity is obtained as a square root of a numerically represented difference between the two records.

6. The database searching method according to claim 1, wherein
   when the display item refers to a keyword list, the dissimilarity is obtained on a basis of a number of elements commonly contained in the two records.

7. The database searching method according to claim 6, wherein
   the dissimilarity is represented as a reciprocal of a value obtained by adding 1 to the number of elements commonly contained in the two records.

8. The database searching method according to claim 1, wherein
   when the display item refers to an item including a document, the dissimilarity is obtained according to a number of words commonly contained in the two records.

9. The database searching method according to claim 8, wherein
   the dissimilarity is represented as a reciprocal of a value obtained by adding 1 to the number of words commonly contained in the two records.

10. The database searching method according to claim 1, wherein
    when the display item refers to an item containing a document, the dissimilarity is obtained according to a sum of associatives between words contained in the two records.

11. The database searching method according to claim 10, wherein
    the dissimilarity is represented as a reciprocal of a value obtained by adding 1 to the sum of the associatives.

12. The database searching method according to claim 1, further comprising the steps of:
    designating a second display item in the plurality of items;
    specifying second item elements corresponding to the second display item in the plurality of records;
    numerically representing a difference between the second item elements of the two records and displaying the difference as a second dissimilarity;
    normalizing the dissimilarity and second dissimilarity;
    obtaining a synthetic dissimilarity by adding the normalized dissimilarity to the normalized second dissimilarity; and
    plotting the plurality of records in such a way that the synthetic dissimilarity corresponds to the distance between the two records.

13. The database searching method according to claim 12, wherein
    in the step of obtaining the synthetic dissimilarity, the normalized dissimilarity and second dissimilarity are added up after being weighed depending on a significance.

14. The database searching method according to claim 1, wherein the plurality of plotted records and the contradiction are numerically displayed on a same screen.

15. The database searching method according to claim 1, wherein the contradiction is represented by a bar graph.

16. The database searching method according to claim 1, wherein the contradiction is represented by colors of the plurality of plotted records.

17. A database searching method for searching a database having records including information about a plurality of items, comprising the steps of:
    generating a retrieval data set by selecting a plurality of records from the database;
    designating a plurality of display items in the plurality of items;
    specifying item elements corresponding to each of the plurality of the display items in the plurality of records in the retrieval data set;
    numerically representing a difference between the item elements of two records in the plurality of records for each of the plurality of display items, as a dissimilarity;
    normalizing the dissimilarity for each of the plurality of display items;
    adding up the normalized dissimilarities for the two records;
    plotting and displaying the plurality of records in such a way that the added-up dissimilarity corresponds to the distance between the two records; and displaying a contradiction which is a value indicative of a degree of inconsistency between a positional arrangement of the plurality of plotted records and a numerical value of the dissimilarity.

18. A database searching system for searching a database having records including information about a plurality of items, comprising:

database storage means for storing the database;

processing means for numerically representing as a dissimilarity a difference between elements of two records in a plurality of records selected in the database, said elements corresponding to a display item designating from among the plurality of items; and display means for plotting and displaying the plurality of records in such a way that the dissimilarity corresponds to a distance between the two records; and for displaying a contradiction which is a value indicative of a degree of inconsistency between a positional arrangement of the plurality of plotted records and a numerical value of the dissimilarity.

19. The database searching system according to claim 18, wherein said processing means selects a record group from the plurality of plotted records on a basis of an object record specified from among the plurality of records; and a new retrieval data set is generated with the selected record group as a new object to be searched.

20. A database searching system for searching a database using a computer, comprising:

a database for storing a plurality of records including information about a plurality of items;

a processor for numerically representing as a dissimilarity of difference between elements of two records in the plurality of records stored in the database, said elements corresponding to a display item designated from among the plurality of items; and a display device for plotting and displaying the plurality of records in such a way that the dissimilarity corresponds to a distance between the two records, and for displaying a contradiction which is a value indicative of a degree of inconsistency between a positional arrangement of the plurality of plotted records and a numerical value of the dissimilarity.

21. The system according to claim 20, wherein said processor specifies records as a new retrieval data set, from the plurality of records displayed on said display device on the basis of an object record selected by a user.

22. A database searching system for searching a database using a computer, comprising:

a database for storing a plurality of records including information about a plurality of items;

a processor for numerically representing as a dissimilarity a difference between elements of two records in the plurality of records stored in the database, said elements corresponding to a plurality of display items designated from among the plurality of items, for normalizing the dissimilarity for each of the plurality of display items, and for adding the normalized dissimilarity for the two records; and a display device for plotting and displaying the plurality of records in such a way that the added-up dissimilarity corresponds to a distance between the two records, and for displaying a contradiction which is a value indicative of a degree of inconsistency between a positional arrangement of the plurality of plotted records and a numerical value of the dissimilarity.

23. A computer-readable storage medium comprising computer programs used to direct a computer to perform the function of:

generating a retrieval data set by selecting a plurality of records from a database having records including information about a plurality of items;

specifying from item elements of the plurality of records in the retrieval data set an item element corresponding to a display item designated in the plurality of items;

numerically representing a difference between item elements of two records in the plurality of records contained in the retrieval data set as a dissimilarity;

plotting and displaying on a display device the plurality of records in such a way that the dissimilarity corresponds to a distance between the two records; and displaying a contradiction which is a value indicative of a degree of inconsistency between a positional arrangement of the plurality of plotted records and a numerical value of the dissimilarity.

24. The storage medium according to claim 23, further including computer programs used to direct the computer to perform the functions of:

specifying records as a new retrieval data set from the plurality of records displayed on said display device on the basis of an object record selected by a user.

25. A computer-readable storage medium comprising computer programs used to direct a computer to perform the functions of:

generating a retrieval data set by selecting a plurality of records from a database having records including information about a plurality of items;

specifying from item elements of the plurality of records in the retrieval data set a plurality of item elements corresponding to a plurality of display items designated in the plurality of items;

numerically representing a difference between item elements of two records in the plurality of records contained in the retrieval data set as dissimilarities for each of the plurality of display items, normalizing the dissimilarities for each of the plurality of display items;

adding up the normalized dissimilarities for the two records;

plotting and displaying on a display device the plurality of records in such a way that the added-up dissimilarity corresponds to the distance between the two records; and displaying a contradiction which is a value indicative of a degree of inconsistency between a positional arrangement of the plurality of plotted records and a numerical value of the dissimilarity.

* * * * *